(12) United States Patent
Ku

(10) Patent No.: US 12,479,401 B2
(45) Date of Patent: Nov. 25, 2025

(54) WIPER ADAPTER

(71) Applicant: DONGGUAN HONGYI WIPER CO., LTD., Dong Guan (CN)

(72) Inventor: Yuan-Chin Ku, New Taipei (TW)

(73) Assignee: DONGGUAN HONGYI WIPER CO., LTD., Dong Guan (CN)

( * ) Notice: Subject to any disclaimer, the term of this patent is extended or adjusted under 35 U.S.C. 154(b) by 52 days.

(21) Appl. No.: 18/444,583

(22) Filed: Feb. 16, 2024

(65) Prior Publication Data

US 2024/0308475 A1 Sep. 19, 2024

Related U.S. Application Data

(60) Provisional application No. 63/453,035, filed on Mar. 17, 2023.

(51) Int. Cl.
*B60S 1/40* (2006.01)

(52) U.S. Cl.
CPC ........... *B60S 1/4003* (2013.01); *B60S 1/4087* (2013.01); *B60S 2001/4022* (2013.01); *B60S 2001/4035* (2013.01)

(58) Field of Classification Search
CPC .... B60S 1/4003; B60S 1/4006; B60S 1/4045; B60S 1/4048; B60S 1/4087; B60S 1/4083; B60S 1/4067; B60S 1/4077; B60S 1/407; B60S 2001/4012; B60S 2001/4022; B60S 2001/4058; B60S 2001/4035; B60S 2001/4032; B60S 2001/4051

USPC ...................................................... 15/250.32
See application file for complete search history.

(56) References Cited

FOREIGN PATENT DOCUMENTS

| EP | 2113432 | * 11/2009 |
| KR | 10-1198352 | * 10/2012 |

OTHER PUBLICATIONS

Machine language translation of description portion of Korean publication 10-1198352, published Oct. 2012. (Year: 2012).*

* cited by examiner

*Primary Examiner* — Monica S Carter
(74) *Attorney, Agent, or Firm* — Li & Cai Intellectual Property Office

(57) ABSTRACT

A wiper adapter includes a base and a shielding cover. The base has a top wall, a pair of side walls, and a pair of bottom walls. Two sides of the top wall respectively include a limiting wall extending upward. A width of the lateral L-shaped structure along a transverse direction is smaller than a width of one of the bottom walls along the transverse direction. The at least one lateral L-shaped structure is configured to stop a displacement of a wiper arm. Each bottom wall has at least one lower L-shaped structure that is configured to stop a displacement of another wiper arm. A receiving slot is formed between the shielding cover and the base, and is configured to receive yet another wiper arm. The shielding cover is connected to a front end of the pair of side walls to stop a displacement of the wiper arm.

13 Claims, 33 Drawing Sheets

WIPER ADAPTER

CROSS-REFERENCE TO RELATED PATENT APPLICATION

This application claims the benefit of priority to U.S. Provisional Patent Application Ser. No. 63/453,035, filed on Mar. 17, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wiper adapter, and more particularly to a connecting system for a wiper adapter that is connected between a wiper arm and a windshield wiper.

BACKGROUND OF THE DISCLOSURE

Due to there being different car manufacturers, wiper arms that are available on the market are designed to have various structures. Thus, different types of wiper adapters are developed for connecting a windshield wiper to a wiper arm. Common windshield wipers need to come with various wiper adapters, which not only requires additional manufacturing costs, such as molds, packaging, etc., but also wastes resources, so that the trend of environmental protection is not met. Furthermore, unnecessary or unused wiper adapters are usually discarded. Therefore, if the same wiper adapter can be used for various different wiper arms, more resources can be saved to meet the trend of environmental protection.

SUMMARY OF THE DISCLOSURE

In response to the above-referenced technical inadequacies, the present disclosure provides a wiper adapter that can be suitable for various types of wiper arms.

In order to solve the above-mentioned problems, one of the technical aspects adopted by the present disclosure is to provide a wiper adapter. The wiper adapter includes a base, and a shielding cover. The base has a top wall, a pair of side walls, and a pair of bottom walls. The pair of side walls is respectively connected to two sides of the top wall along a longitudinal direction. The pair of bottom walls is respectively connected to a bottom of the pair of side walls. The two sides of the top wall each include a limiting wall extending upward. At least one of the side walls includes at least one lateral L-shaped structure, a width of the at least one lateral L-shaped structure extending outward from the side walls along a transverse direction is smaller than a width of one of the bottom walls along the transverse direction. The at least one lateral L-shaped structure is configured to stop a displacement of a wiper arm. At least one of the bottom walls has at least one lower L-shaped structure. The at least one lower L-shaped structure is configured to stop a displacement of another wiper arm. The shielding cover is connected to a front end of the pair of side walls, a receiving slot is formed between the shielding cover and the base, and the receiving slot is configured to receive yet another wiper arm. The shielding cover is configured to stop a displacement of the wiper arm.

Therefore, in the wiper adapter provided by the present disclosure, by virtue of a plurality of L-shaped structures on the base, more resources can be saved, and the trend of environmental protection can be fulfilled.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 9A to 9D are schematic perspective views of assembly steps of the wiper adapter according to the present disclosure and a first type of wiper arm, in which FIG. 9C is an enlarged view of a portion "IXC" of FIG. 9B;

FIG. 15A to FIG. 15D are schematic perspective views of assembly steps of the wiper adapter according to the present disclosure and a seventh type of wiper arm, in which FIG. 15C is an enlarged cross-sectional view of a portion "XVC" of FIG. 15B;

FIG. 16A to FIG. 16D are schematic perspective views of the assembly steps of the wiper adapter according to the present disclosure and an eighth type of wiper arm, in which FIG. 16C is an enlarged cross-sectional view of a portion "XVIC" of FIG. 16B;

DETAILED DESCRIPTION OF THE EXEMPLARY EMBODIMENTS

Figure 1:
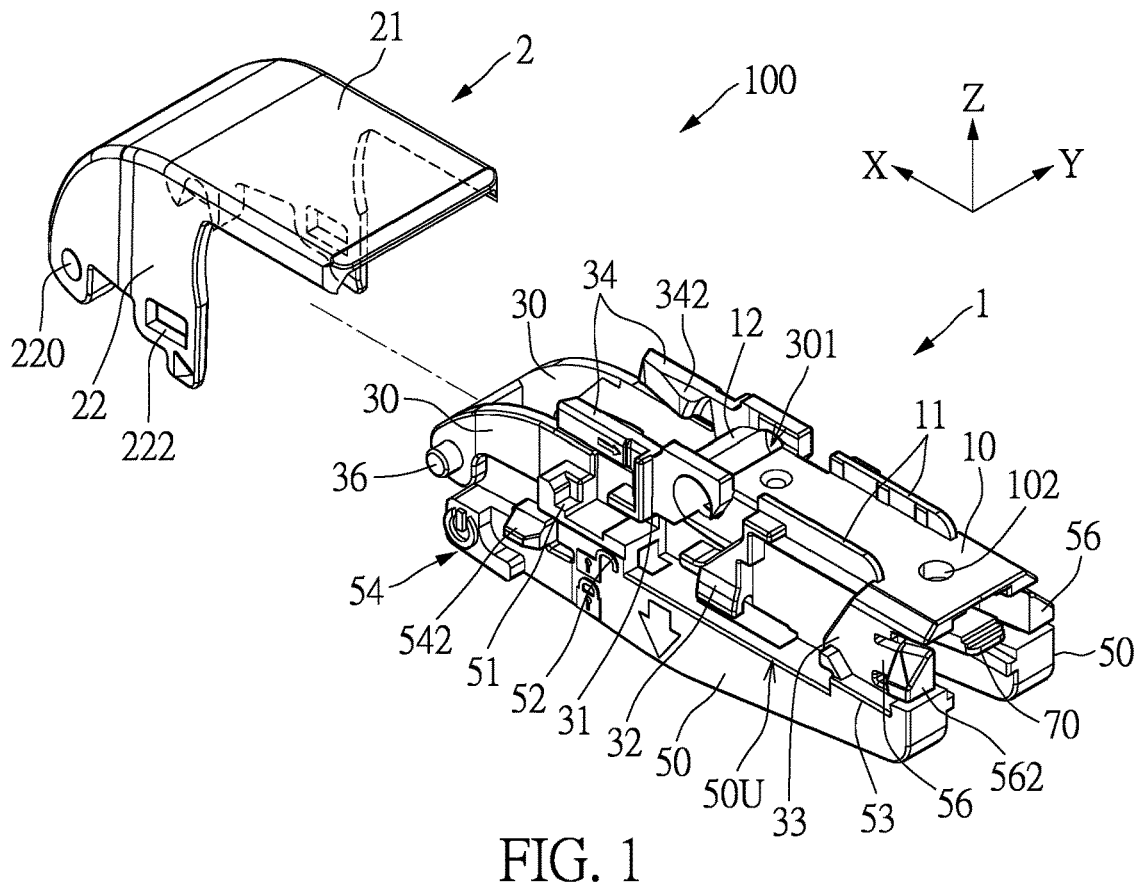
FIG. 1 is a schematic exploded side view of a wiper adapter according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Reference is made to FIG. 1 to FIG. 4, which are different exploded views of a wiper adapter of the present disclosure. The present disclosure provides a wiper adapter 100, which includes a base 1, and a shielding cover 2. For convenience of description, one end of the wiper adapter 100 that is close to the shielding cover 2 is referred as a front end, and another end of the wiper adapter 100 is referred as a rear end.

Figure 9A:
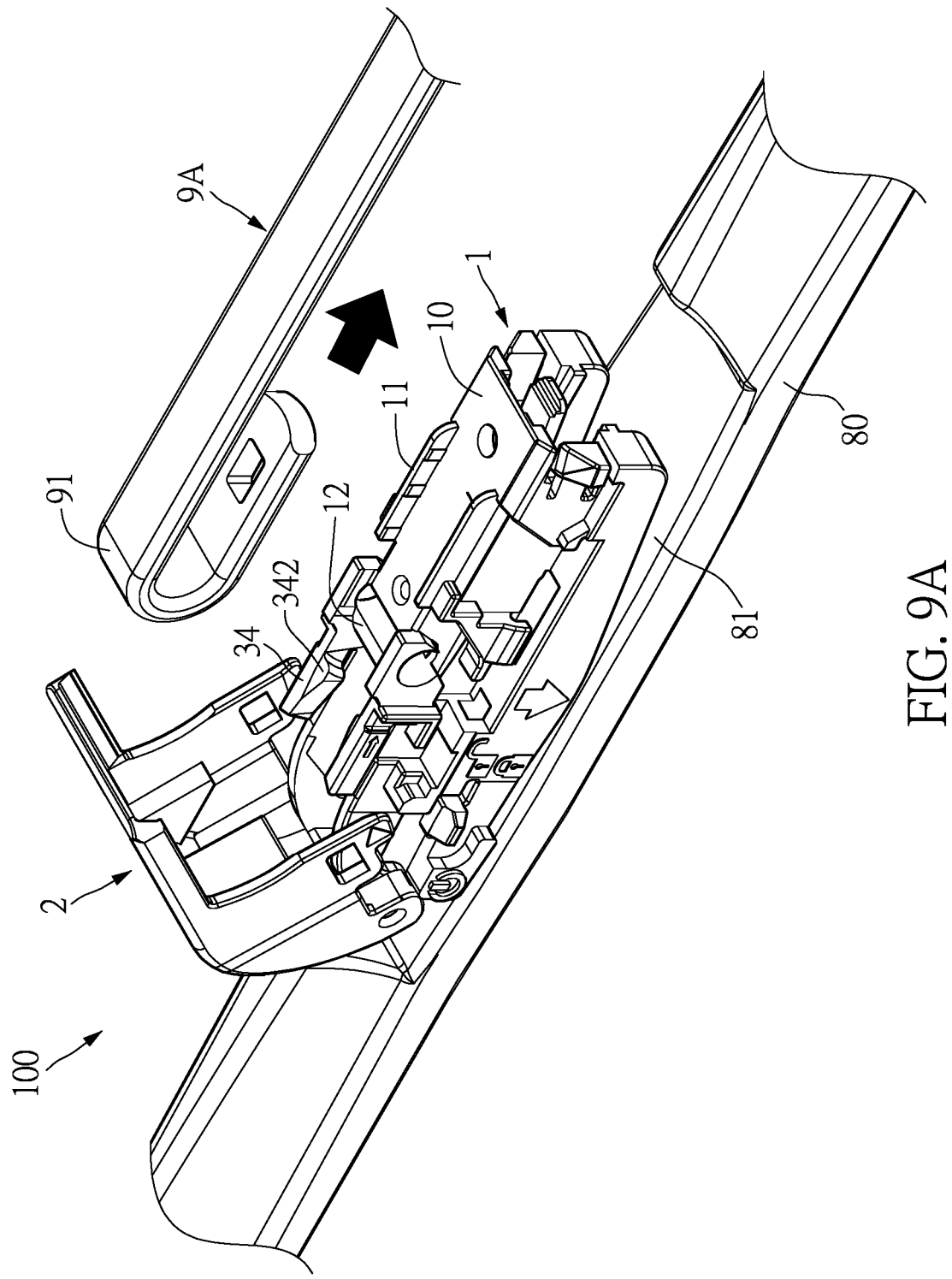

The base 1 includes a top wall 10, a pair of side walls 30, and a pair of bottom walls 50. The pair of side walls 30 are parallel to each other in a longitudinal direction, and connected to two sides of the top wall 10, respectively. The pair of bottom walls 50 are connected to a bottom of the pair of side walls 30, respectively. Each side of the top wall 10 has a limiting wall 11 protruded upward. The above-mentioned longitudinal direction is parallel to the X-axis of coordinate, that is a longitudinal direction of the wiper adapter 100, and an extending direction along the windshield wiper 80 as shown in FIG. 9A.

Figure 8:
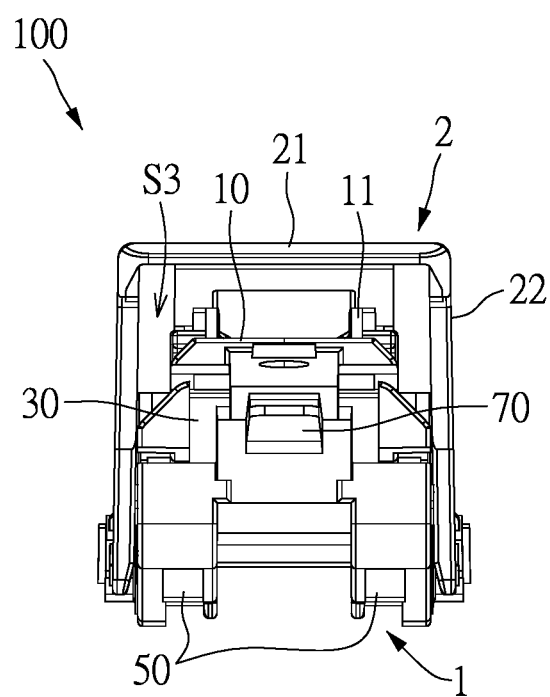
FIG. 8 is a schematic assembled rear view of the wiper adapter according to the present disclosure.

The shielding cover 2 is connected to a front end of the pair of side walls 30. Referring to FIG. 8, a receiving slot S3 is formed between the shielding cover 2 and the pair of side walls 30. The receiving slot S3 is substantially U-shaped, which is used to receive a wiper arm. In this embodiment, the shielding cover 2 is pivotally connected to the pair of side walls 30, but the present disclosure is not limited thereto. The shielding cover 2 can be connected to the base 1 in an engaged manner. The shielding cover 2 can be used to limit a displacement of the wiper arm in a transverse direction, which is parallel to the Y-axis of the coordinate, and a vertical direction that is perpendicular to the transverse direction, which is parallel to the Z-axis of the coordinate, examples of which will now be described.

Figure 3:
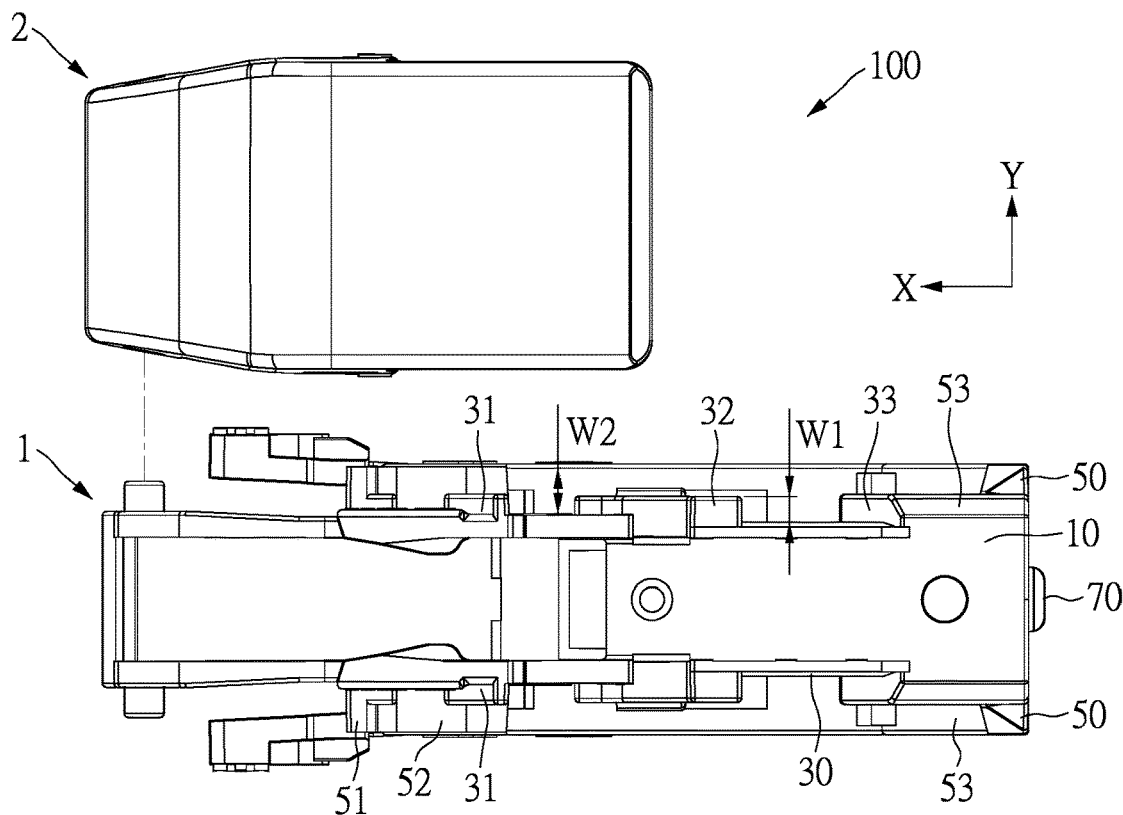
FIG. 3 is a top exploded view of the wiper adapter according to the present disclosure.

One characteristic of the present disclosure is that, each of the side walls 30 has at least one lateral L-shaped structure. The lateral L-shaped structure means a member having an L-shape, such as a vertical L-shape, or a horizontal L-shape, or an inverted L-shape, or a plurality of L-shaped portions connected to each other. However, the present disclosure is not limited thereto. The structural features can be only formed on one of the side walls 30. Reference is made to FIG. 3. The at least one lateral L-shaped structure has a width W1 that is protruded outward from the side walls 30 in the transverse direction, and that is smaller than a width W2 of the bottom walls 50 in the transverse direction. The transverse direction is parallel to the Y-axis coordinate, indicating that a width direction of the wiper adapter 100 is a direction being perpendicular to the wiper arm. The at least one lateral L-shaped structure can be used to block the displacement of the wiper arm in the vertical direction, examples of which will be described below. The vertical direction is parallel to the Z-axis coordinate, and represents a height direction of the wiper adapter 100.

Another characteristic of the present disclosure is that each of the bottom walls 50 has at least one lower L-shaped structure. The at least one lower L-shaped structure is configured to block a displacement of the wiper arm along the longitudinal direction, examples of which will be described below. However, the present disclosure is not limited thereto. These lower L-shaped structures can be formed on only one side of the bottom walls 50.

The base 1 will be introduced in more detail below.

Figure 5:
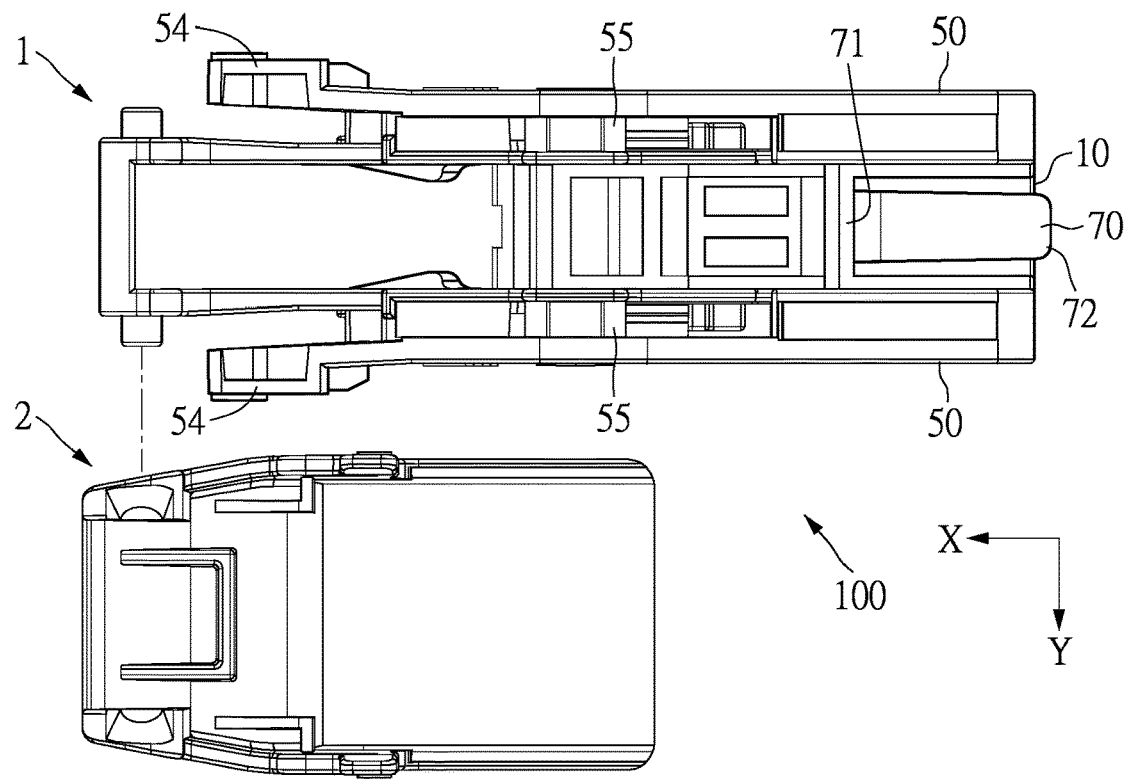
FIG. 5 is a bottom exploded view of the wiper adapter according to the present disclosure.

Reference is made FIG. 1. The top wall 10 of the base 1 has a limiting hole 102. The limiting hole 102 is close to a rear end of the top wall 10. Referring to FIG. 5, wherein the wiper adapter 100 further includes a limiting positioning member 70 that is arranged below the top wall 10. The limiting positioning member 70 has a fixing end 71, and a free end 72. The fixing end 71 is connected to an inner side of the pair of side walls 30. The free end 72 extends rearward beyond the top wall 10.

The pair of side walls 30 further has a pair of latching elastic arms 34. The pair of latching elastic arms 34 is arranged at a front of the top wall 10, and extends toward the shielding cover 2 in the longitudinal direction, that is parallel to X-axis direction. An inner side of each of the latching elastic arms 34 forms a locking protrusion 342.

The wiper adapter 100 further includes a transverse through hole 301. The transverse through hole 301 passes through the pair of side walls 30, and is arranged at a substantial central position of the wiper adapter 100.

Each of the pair of the side walls 30 of the base 1 has a first side-positioning member 31, a second side-positioning member 32, and a third side-positioning member 33, that are configured to the lateral L-shaped structures, respectively. The first side-positioning member 31 is arranged to be close to a front end 12 of the top wall 10. The third side-positioning member 33 is arranged to be close to a rear end of the top wall 10. The second side-positioning member 32 is arranged between the first side-positioning member 31 and the second side-positioning member 32. A front limiting space S1 is formed between the first side-positioning member 31 and the second side-positioning member 32. A rear limiting space S2 is formed between the second side-positioning member 32 and the third side-positioning member 33.

Figure 4:
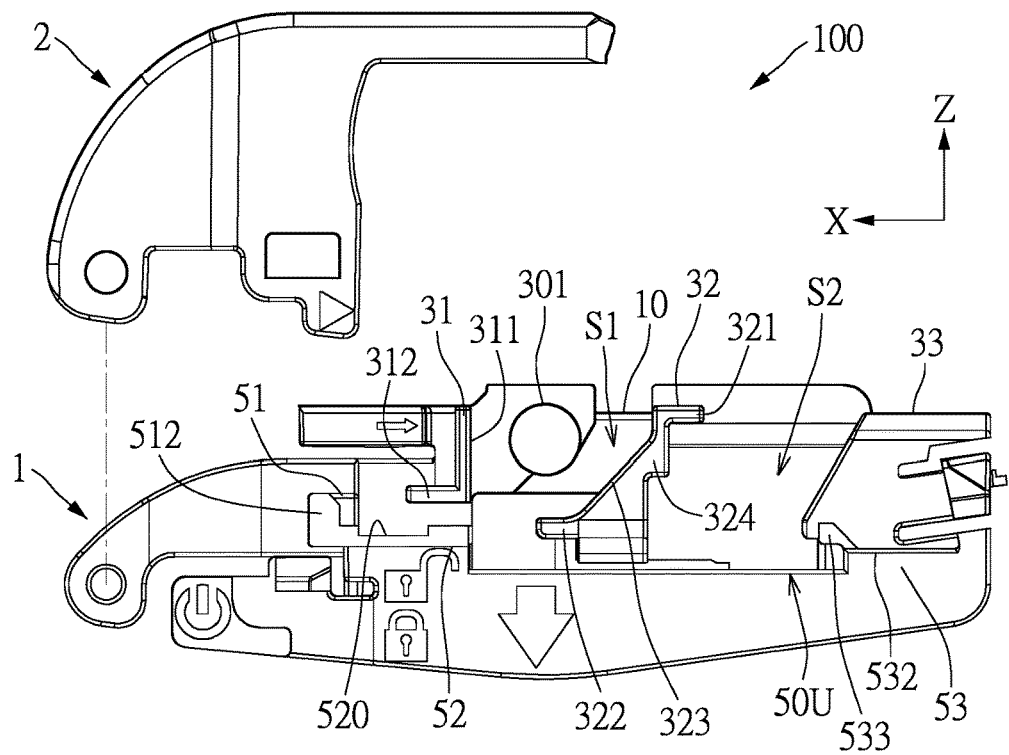
FIG. 4 is a side exploded view of the wiper adapter according to the present disclosure.

Reference is made to FIG. 4. The first side-positioning member 31 has a first vertical portion 311, and a first horizontal portion 312. The first horizontal portion 312 is connected to a bottom end of the first vertical portion 311 and toward the shielding cover 2, so as to be L-shaped. The first horizontal portion 312 and the bottom walls 50 are spaced away with a distance that is configured to limit a protruded portion of the wiper arm, examples of which will now be described.

The second side-positioning member 32 has an upper horizontal portion 321, a lower horizontal portion 322, a slope portion 323, and a rear bump 324. The slope portion 323 is connected between the upper horizontal portion 321 and the lower horizontal portion 322. The upper horizontal portion 321 is extended rearward. The lower horizontal portion 322 is extended forward. The rear bump 324 is formed at one side of the slope portion 323 and is protruded rearward.

Reference is made to FIG. 1. Each side of the pair of side walls 30 of the base 1 has a rear elastic arm 56, respectively. Each of the rear elastic arms 56 has an outward restricting portion 562.

Each of the pair of the bottom walls 50 of the base 1 has a first lower-positioning member 51, a second lower-positioning member 52, and a third lower-positioning member 53, that are configured to the lower L-shaped structures. The second lower-positioning member 52 is arranged beneath the first side-positioning member 31. The first lower-positioning member 51 is arranged in front of the second lower-positioning member 52. The third lower-positioning member 53 is arranged below the third side-positioning member 33. A lower holding groove 50U is formed between the second lower-positioning member 52 and the third lower-positioning member 53.

Reference is made to FIG. 4. The second lower-positioning member 52 is protruded from one lateral edge of the lower holding groove 50U toward the first side-positioning member 31. The top surface of the second lower-positioning member 52 forms a top limiting slot 520.

The first lower-positioning member 51 is connected to the second lower-positioning member 52 and the side walls 30. The first lower-positioning member 51 is protruded outward from the side walls 30 to a side of the second lower-positioning member 52. The first lower-positioning member 51 is formed with a front blocking portion 512, which is opposite to a bottom portion of the first side-positioning member 31.

The third lower-positioning member 53 is arranged in a block shape and is protruded from another lateral edge of the lower holding groove 50U toward the third side-positioning member 33, so as to form a stepped structure.

Specifically, the third lower-positioning member 53 has a stepped protrusion 532, as shown in FIG. 4. A bottom portion of the stepped protrusion 532 is higher than the bottom wall 50. In addition, the third lower-positioning member 53 further has a hooking block 533 protruded forward. The hooking block 533 is formed at a top front end of the stepped protrusion 532.

Reference is made to FIG. 1, wherein the pair of bottom walls 50 of the base 1 further has a pair of releasing elastic arms 54, respectively. The pair of releasing elastic arms 54 is extended forward from a front end of the pair of bottom walls 50, respectively. Each of the releasing elastic arms 54 has a lateral buckle member 542. The lateral buckle member 542 is arranged on a top edge of the releasing elastic arms 54.

Figure 2:
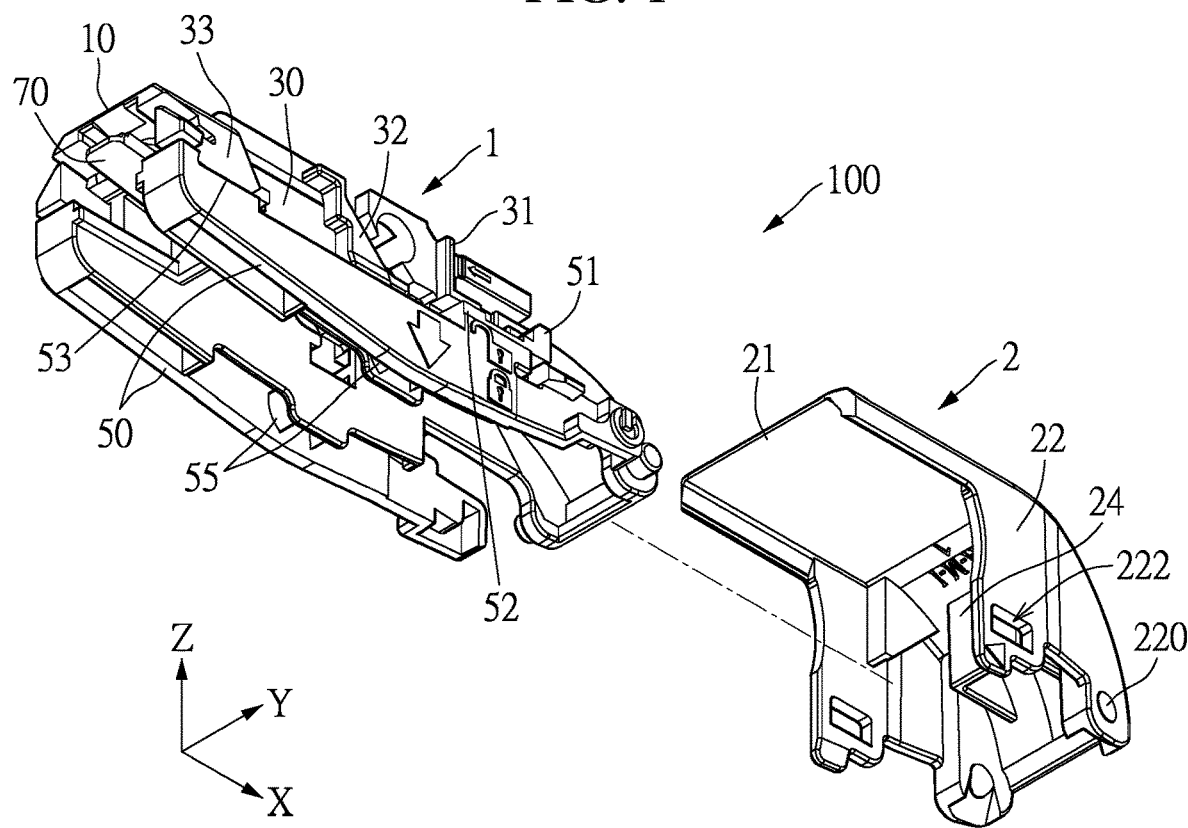
FIG. 2 is another schematic exploded side view of the wiper adapter according to the present disclosure.

Referring to FIG. 2 and FIG. 5, wherein FIG. 5 is a bottom exploded view of the wiper adapter of the present disclosure. The pair of bottom walls 50 of the base 1 has a pivotal axle 55 that is formed in its interior, so as to pivotally connect to a fixing seat 81 of the windshield wiper 80.

Figure 6:
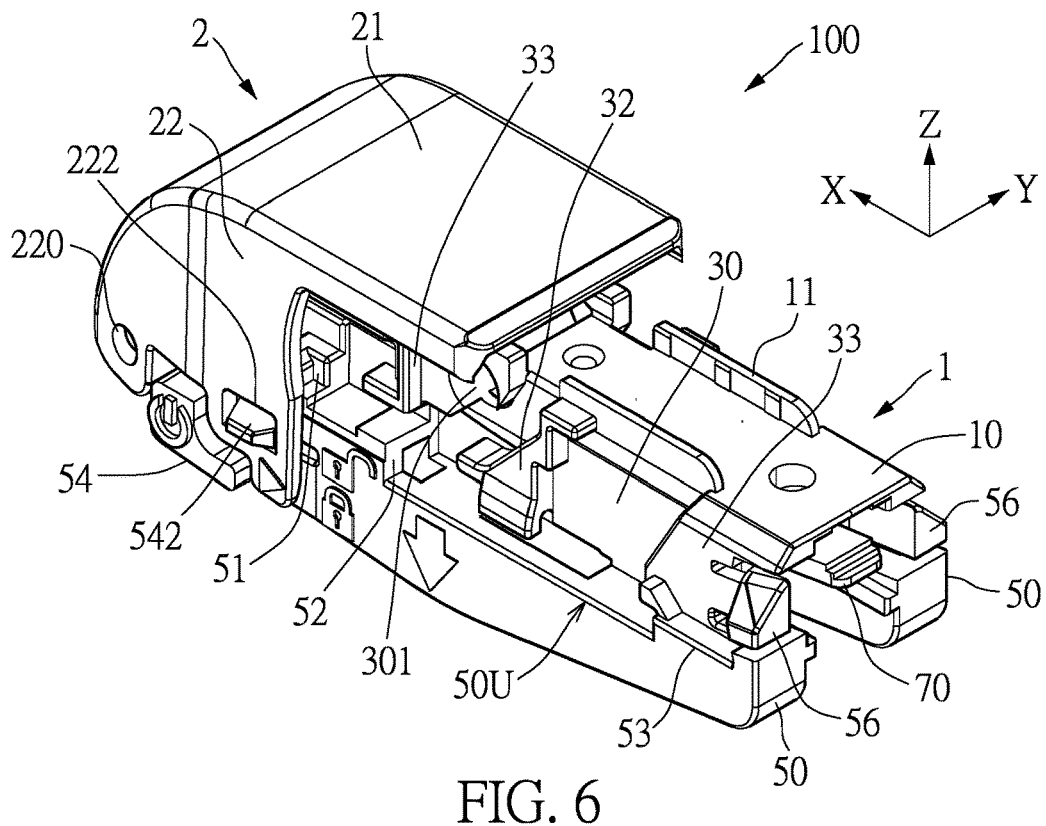
FIG. 6 is a schematic assembled perspective view according to the wiper adapter of the present disclosure.
Figure 7:
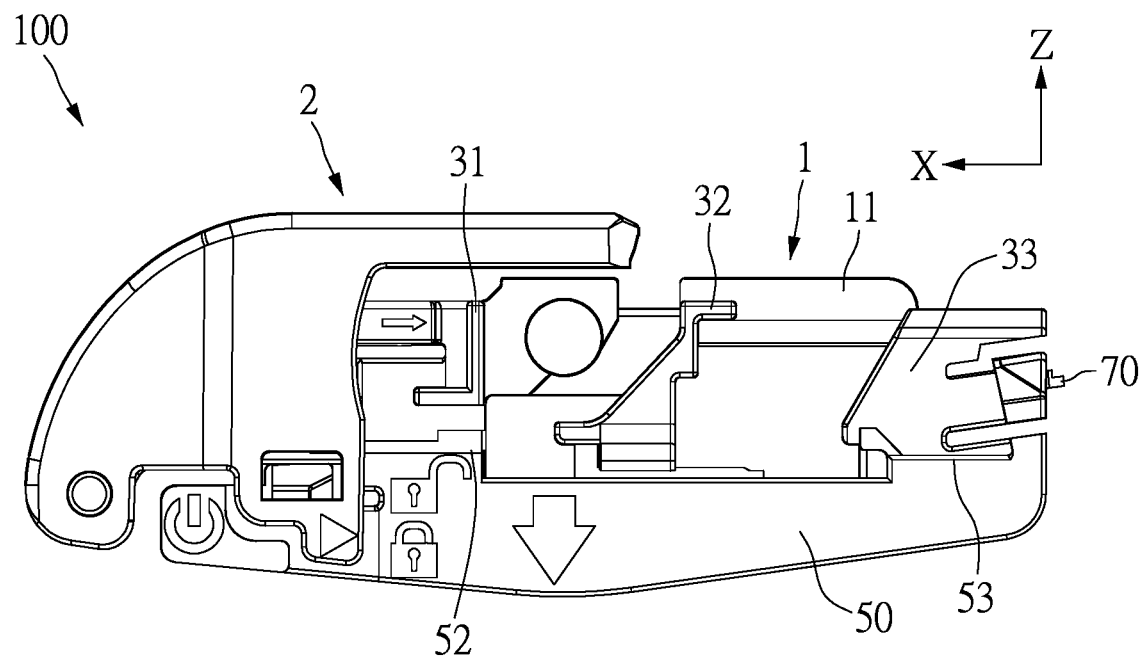
FIG. 7 is a schematic assembled side view of the wiper adapter according to the present disclosure.

Reference is made to FIG. 6 to FIG. 8, which are a perspective view, a side view, and a rear view of the wiper adapter according to the present disclosure. Also, referring to FIG. 1, the shielding cover 2 has an arc-shaped upper covering board 21, and a pair of side covering boards 22. The pair of side covering boards 22 is connected to two sides of the upper covering board 21, respectively. An inner side of the upper covering board 21 has a pressing member 24 that is protruded downward, as shown in FIG. 2. Each of the side covering boards 22 has a pivotal hole 220, and a buckle hole 222. The front end of the base 1 has a pair of pivotal axles 36 that are formed on the pair of side walls 30, respectively. The pivotal axles 36 are pivotally disposed in the pivotal holes 220. The shielding cover 2 can be rotated along the pivotal axles 36 to cover on a top portion of the base 1. Referring to FIG. 1 and FIG. 6, the lateral buckle members 542 of the releasing elastic arms 54 are wedged in the buckle holes 222 of the side covering board 22, so that the shielding cover 2 can be fixed to the base 1. If a user wants to open the shielding cover 2, the user can press the pair of releasing elastic arms 54, and then the lateral buckle members 542 can escape from the buckle holes 222. At that time, the shielding cover 2 can be rotated outward.

Figure 9B:
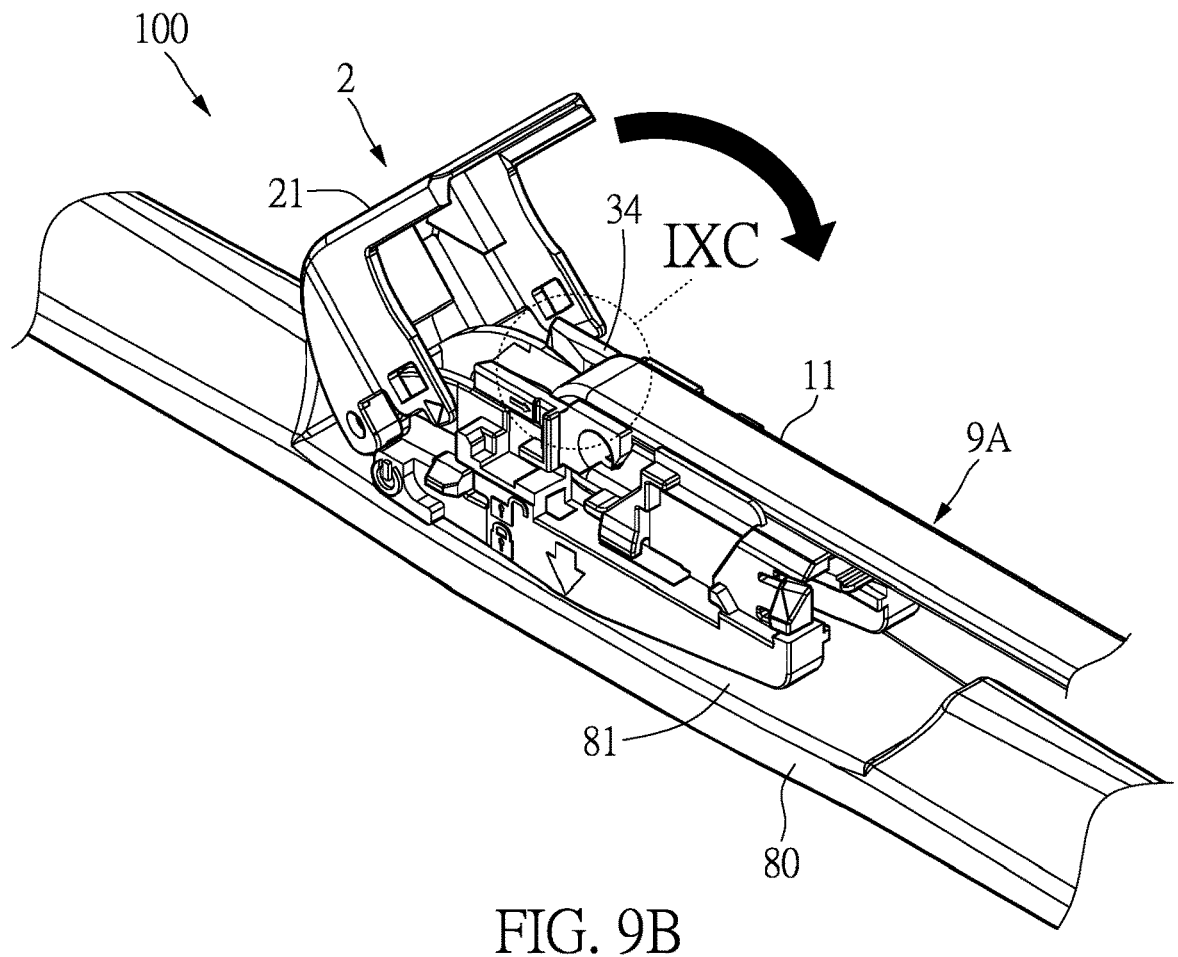
Figure 9C:
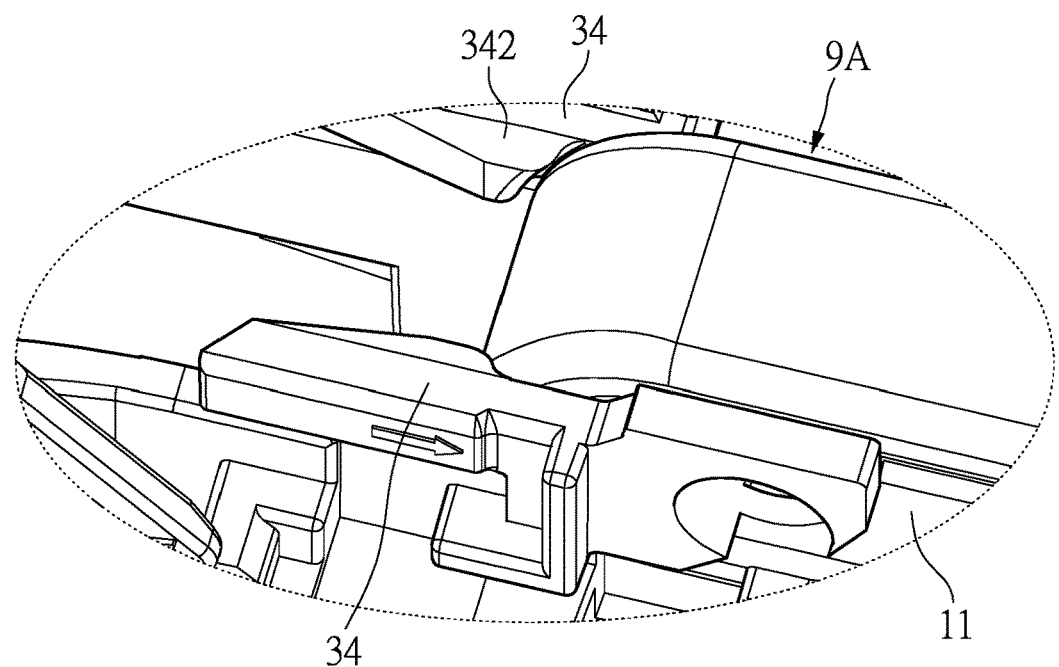
Figure 9D:
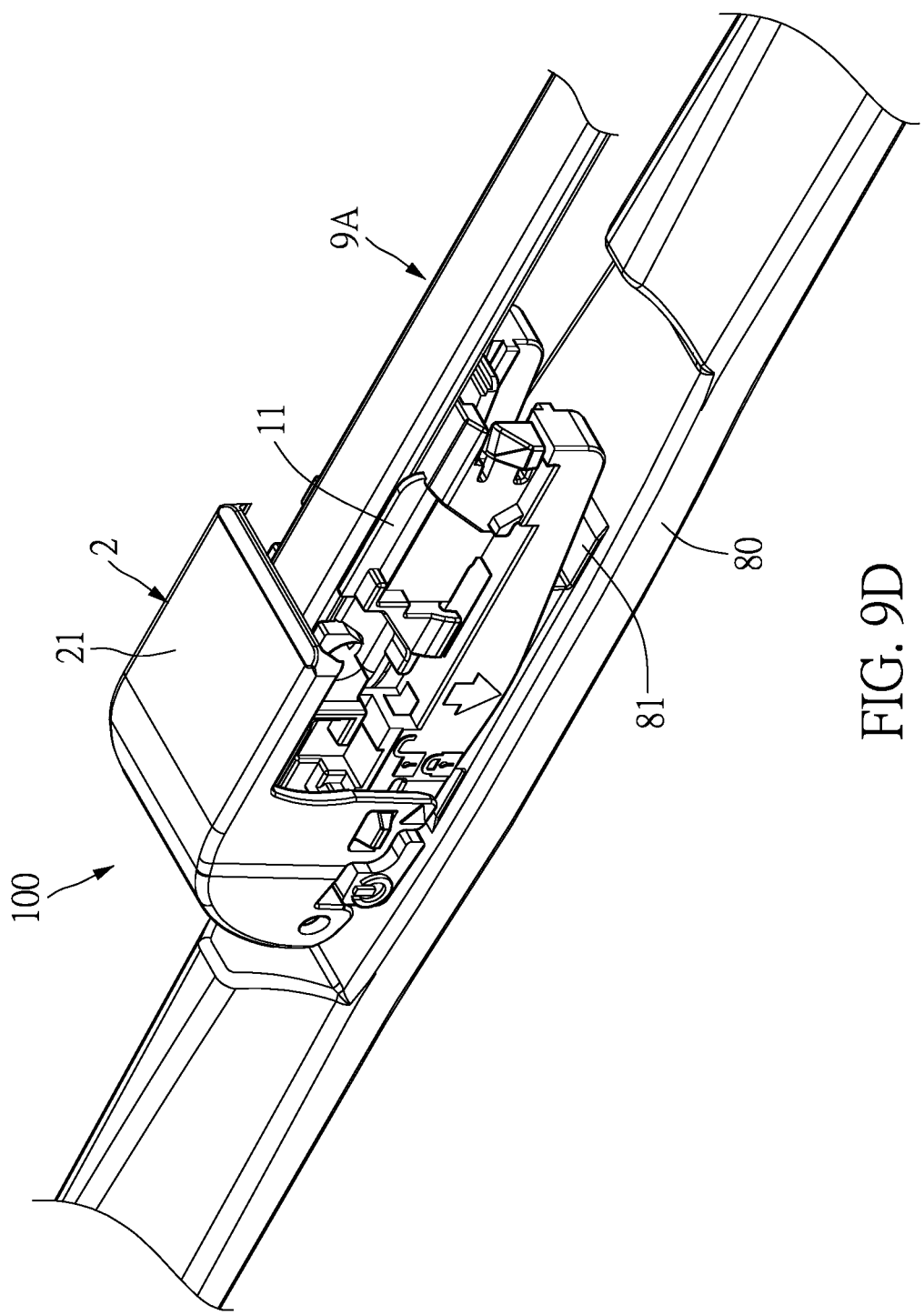

Reference is made to FIG. 9A to FIG. 9D, which depict schematic views of the assembly steps of the wiper adapter according to the present disclosure and a first type of wiper arm 9A. The wiper adapter 100 of the present disclosure can be adapted to the first type of the wiper arm 9A. The wiper arm 9A is a J-hook type wiper arm. The assembly steps are as follows. A hook portion 91 of the wiper arm 9A is inserted into the base 1. As shown in FIG. 9C, the two locking protrusions 342 of the latching elastic arms 34, which are formed on a front end of the base 1, are snapped to the wiper arm 9A, so as to prevent the wiper arm 9A from loosening. In other words, the two locking protrusions 342 can limit the displacement of the wiper arm 9A in the X axis direction. In addition, the wiper arm 9A is disposed between the two limiting walls 11 of the top wall 10, so that the displacement of the wiper arm 9A in the Y-axis direction can be limited. Finally, as shown in FIG. 9B and FIG. 9D, the shielding cover 2 is rotated in a closed state, and the shielding cover 2 can limit the displacement of the wiper arm 9A in the Z-axis direction, so as to realize its locking function. Furthermore, the J-hook type wiper arm has various sizes, which are adapted to the wiper adapter 100 of the present disclosure.

Figure 10A:
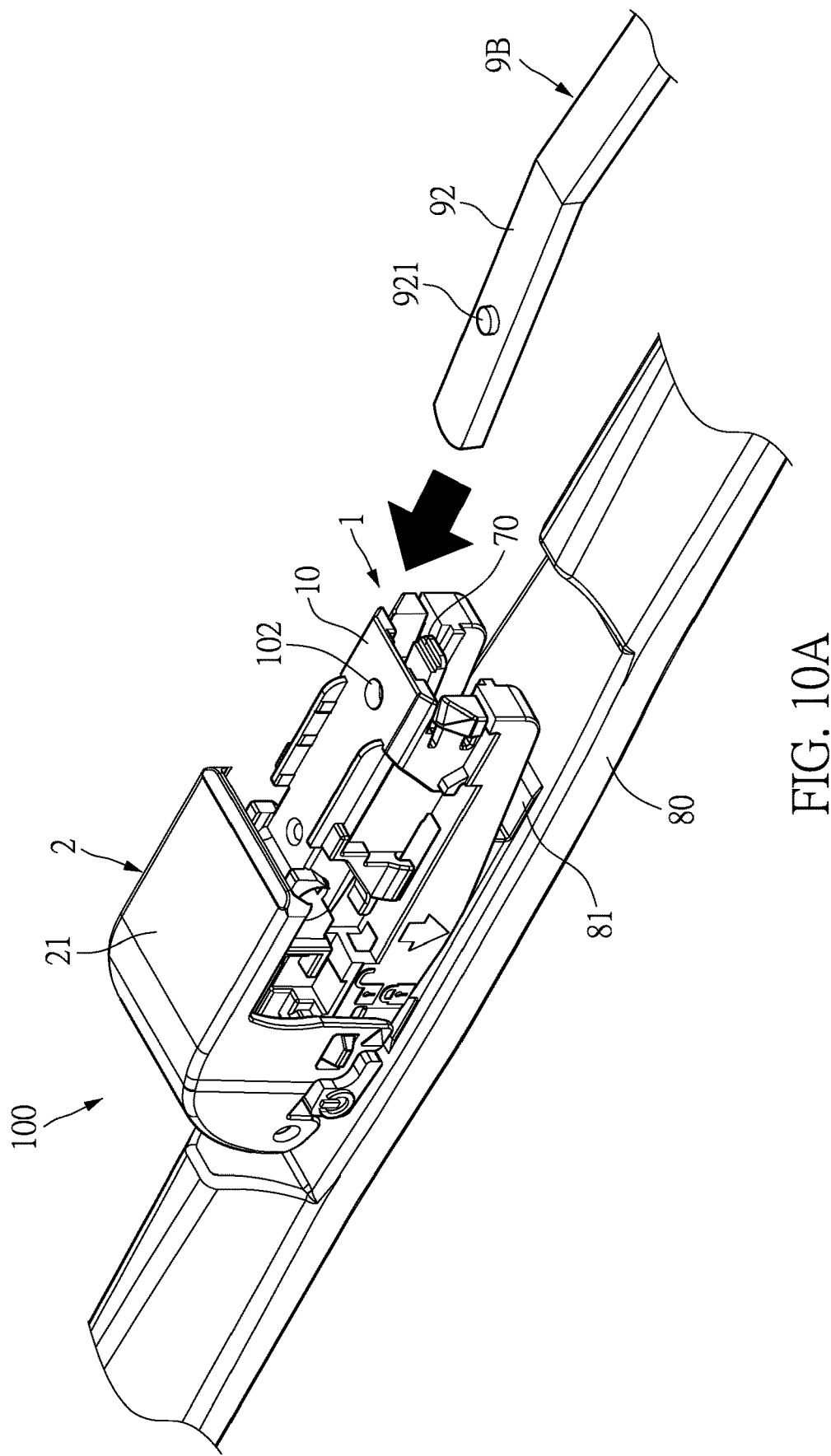
FIG. 10A to FIG. 10B are schematic perspective views of the assembly steps of the wiper adapter according to the present disclosure and a second type of wiper arm.
Figure 10B:
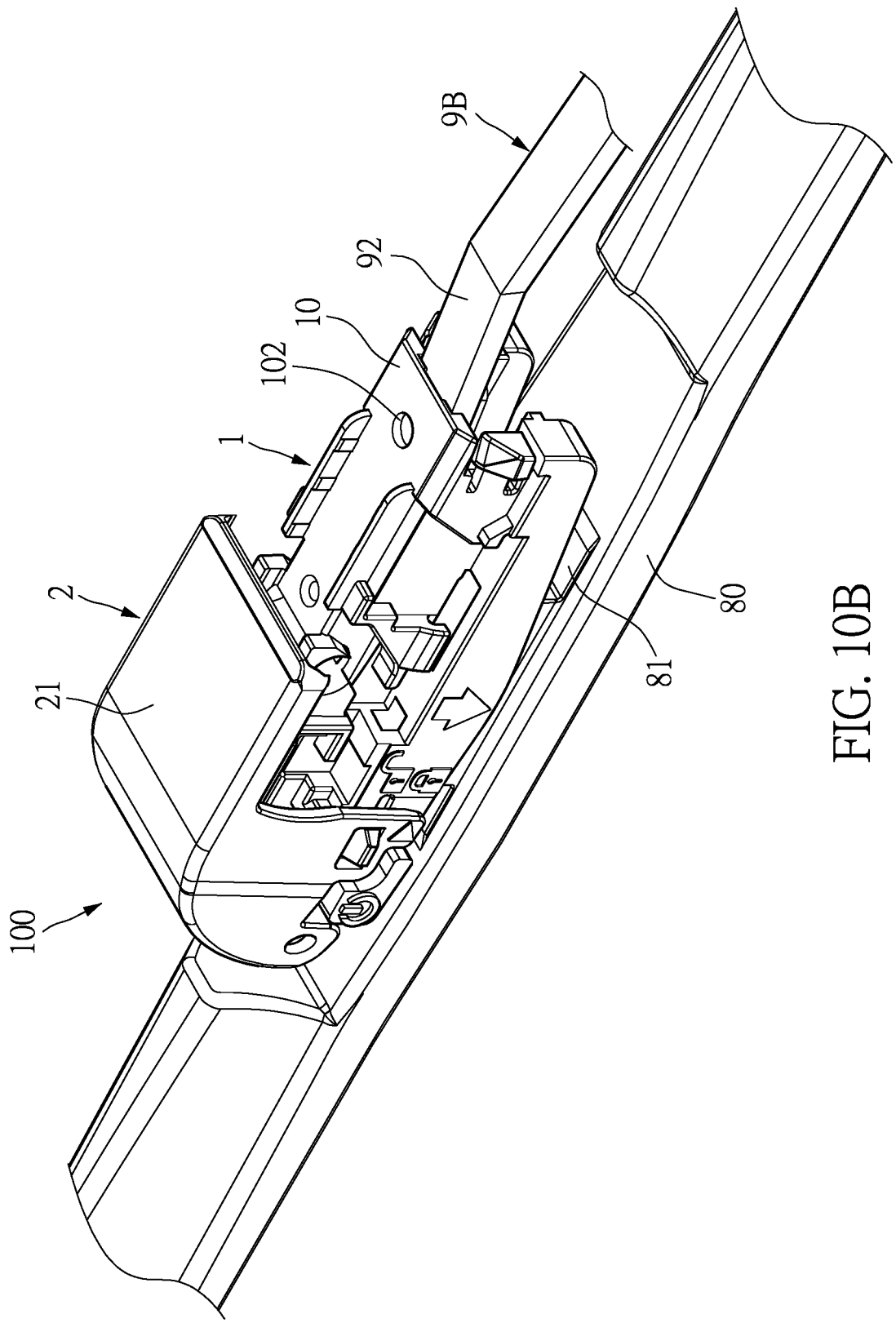

Reference is made to FIG. 10A to FIG. 10B, which depict schematic views of the assembly steps of the wiper adapter according to the present disclosure and a second type of wiper arm 9B. The wiper adapter 100 of the present disclosure can be adapted to the second type of wiper arm 9B. The wiper arm 9B is a bayonet style wiper arm. A front end of the bayonet style wiper arm has an oblique section 92. The oblique section 92 has a protruded portion 921. The assembly steps of the wiper arm 9B are as follows. The wiper arm 9B is inserted in a gap on the rear end of the base 1 between the top wall 10 and the limiting positioning member 70. The top wall 10 has a limiting hole 102. After the wiper arm 9B is inserted the gap, the protruded portion 921 of the wiper arm 9B is engaged with the limiting hole 102 to fulfill its function. When a user wants to detach the wiper arm 9B, the user can press the limiting positioning member 70, and the protruded portion 921 of the wiper arm 9B can escape from the limiting hole 102.

Figure 11A:
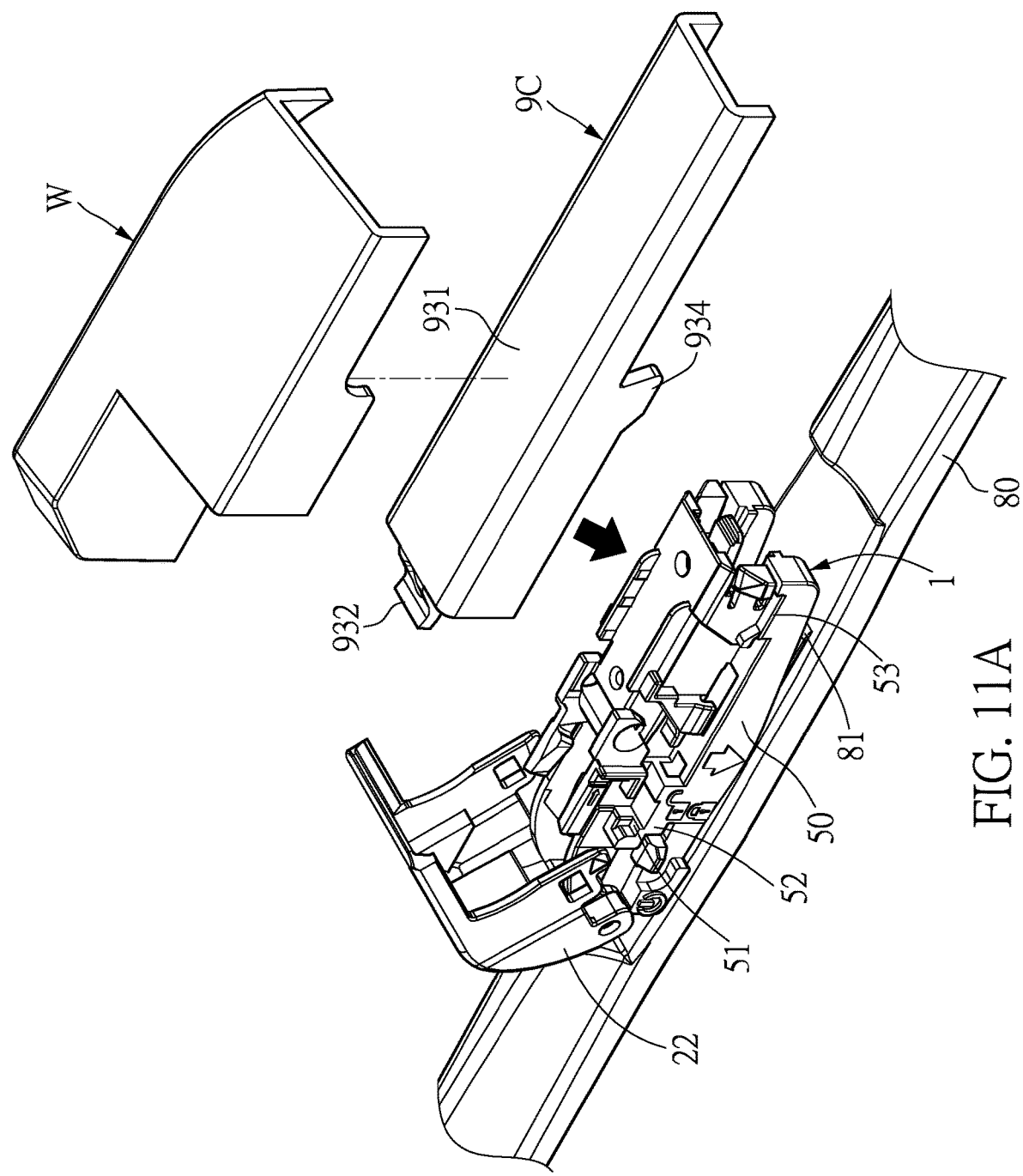
FIG. 11A to FIG. 11C are schematic perspective views of the assembly steps of the wiper adapter according to the present disclosure and a third type of wiper arm.
Figure 11B:
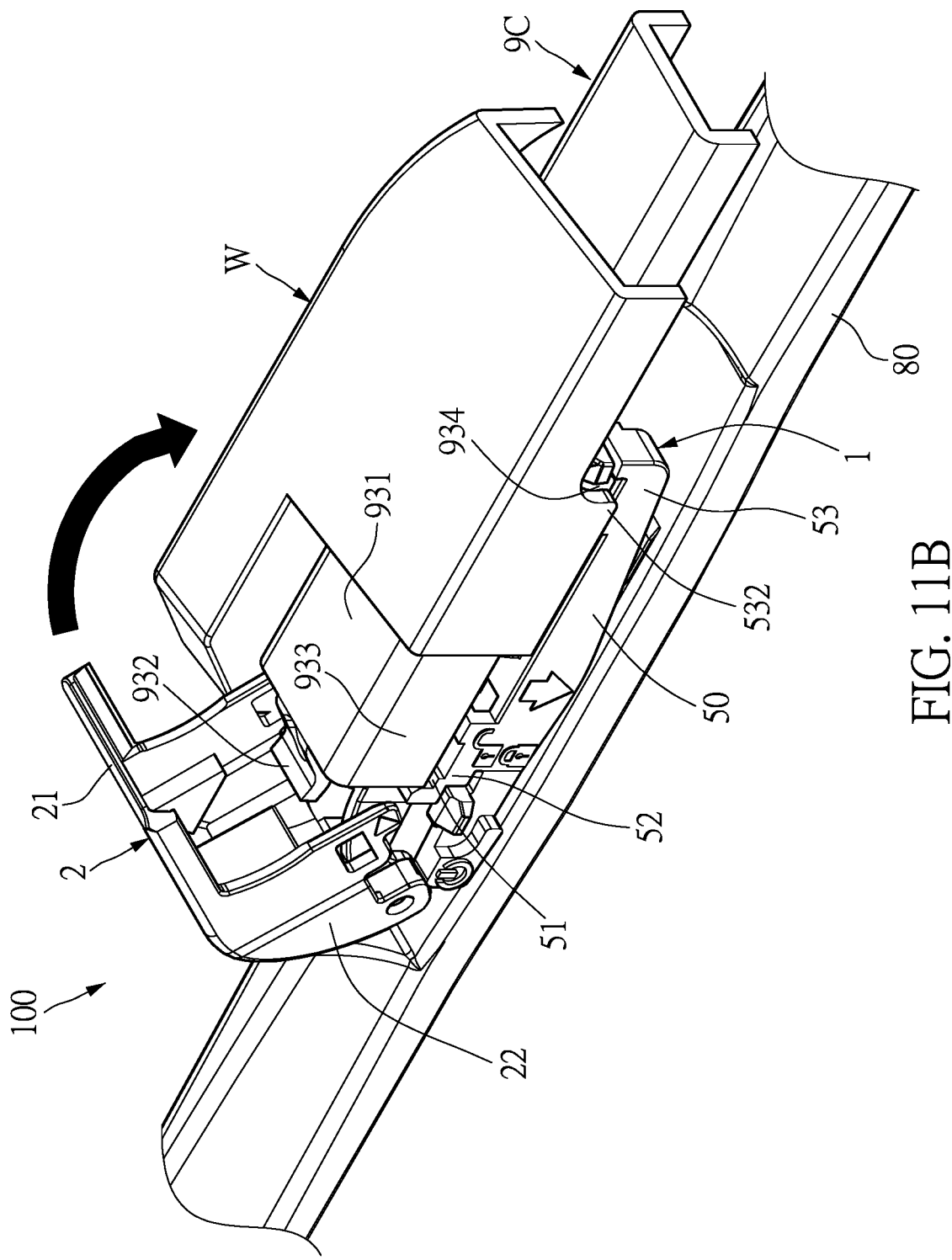
Figure 11C:
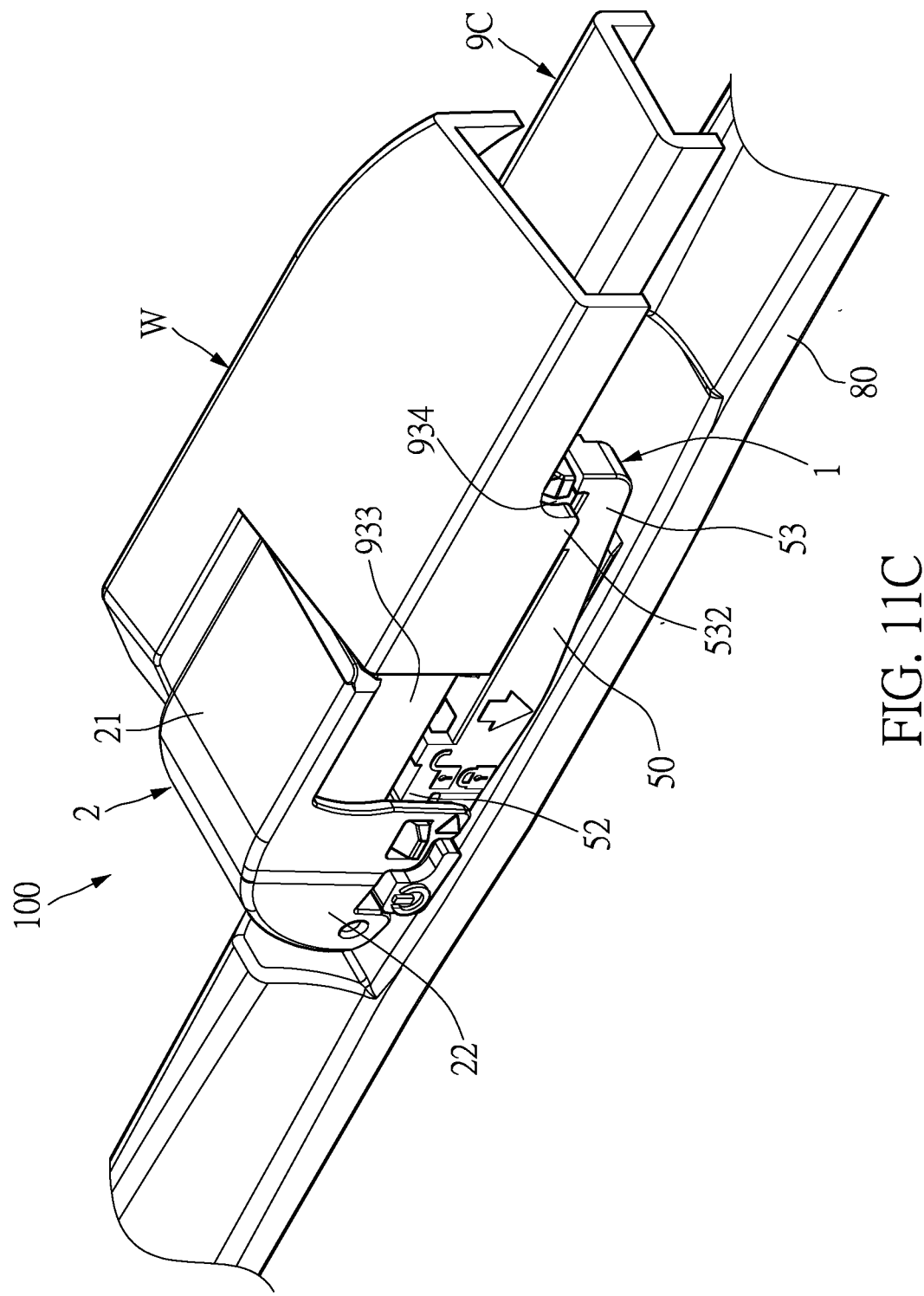

Reference is made to FIG. 11A to FIG. 11C, which depict schematic views of the assembly steps of the wiper adapter according to the present disclosure and a third type of wiper arm 9C. The wiper adapter 100 of the present disclosure can be adapted to the third type of wiper arm 9C. The wiper arm 9C is an A-type pinch tab wiper arm with a spray accessory kit W, which has a gradually-enlarged end. The front end of the wiper arm 9C has a top wall 931, and a pair of side wings 933. The top wall 931 is positionally corresponded with a wider part of the wiper adapter 100 that is substantially equal to the width of the wiper adapter 100. The end of the top wall 931 far away from the wiper adapter 100 has a smaller width. The front end of the top wall 931 of the wiper arm 9C extends a pressed fixing portion 932. Each of the side wings 933 extends rearward to form a slanted leg 934. The third lower-positioning member 53 of the bottom wall 50 of the base 1 is abutted against to fix the slanted leg 934 of the wiper arm 9C, so that it can prevent the wiper arm 9C from being back off or tilted up. After the wiper arm 9C is assembled to the base 1, the front end of the side wing 933 is abutted against the first lower-positioning member 51, and the rear end of the side wing 933 is abutted against the stepped protrusion 532, so that it can limit a forward displacement or a rearward displacement of the wiper arm 9C. Then, the shielding cover 2 is engaged with the base 1, and the pressing member 24 of the shielding cover 2 can press and fix the pressed fixing portion 932, so that the wiper arm 9C is further fixed to prevent the front end of the wiper arm 9C from raising upward. When dismounting, a user only need to press the pair of releasing elastic arms 54 at the front end of the base 1 to release the shielding cover 2. The shielding cover 2 can be loosened and opened from the base 1. The mounting and dismounting processes are convenient and quick.

Figure 11D:
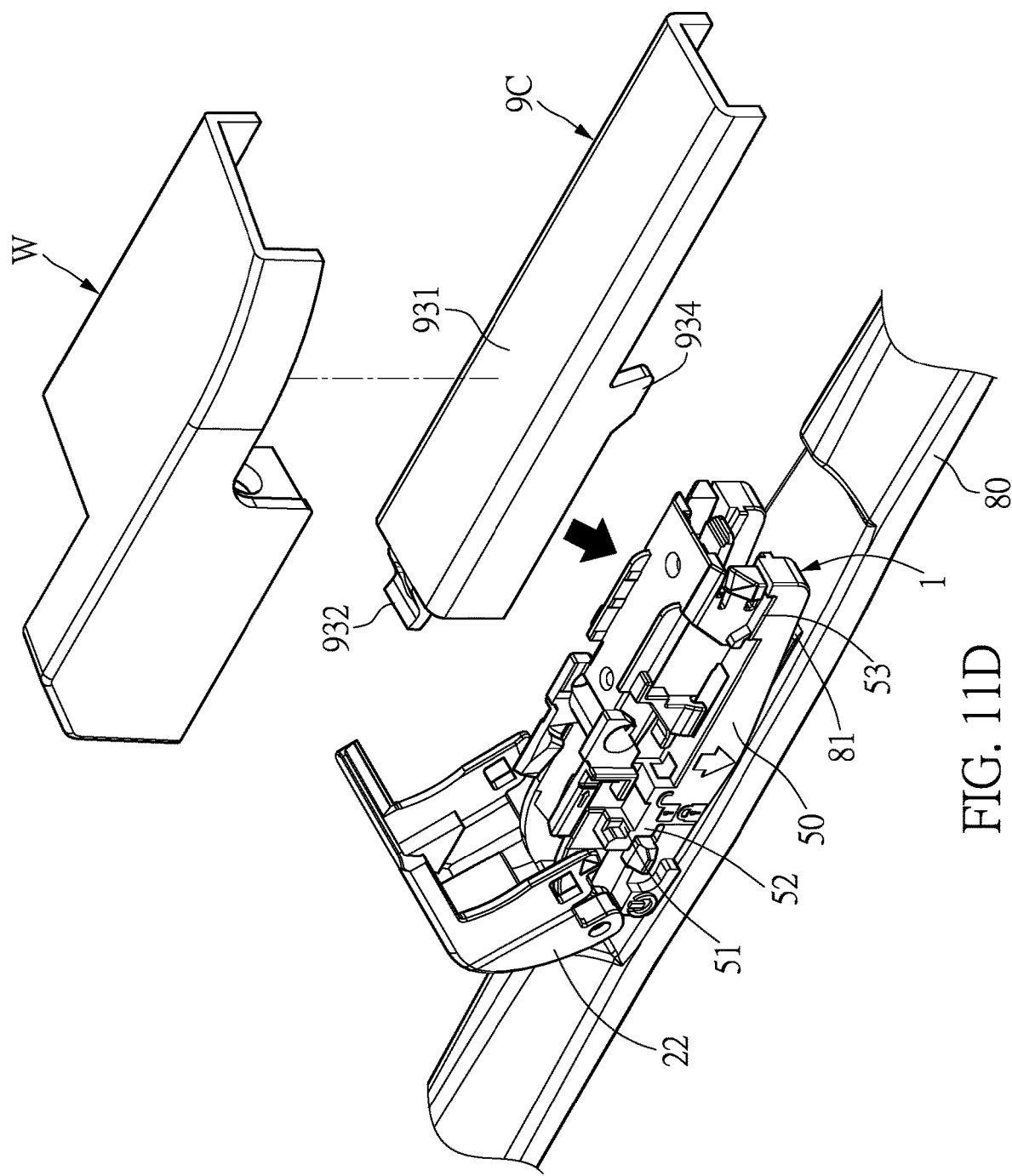
FIG. 11D is a schematic perspective view of a disassembly step of the wiper adapter according to the present disclosure and the third type of right-hand drive wiper arm.

Reference is made to FIG. 11D, which is an exploded perspective view of the wiper adapter according to the present disclosure and a third type right-hand drive wiper arm. This embodiment shows the wiper adapter of the present disclosure also can be applied to the third type right-hand drive wiper arm. The main difference is that the wiper arm has a fluid nozzle kit W. Referring to FIG. 11A, the right-hand drive and left-hand drive wiper arms are structurally symmetrical, and the detailed assembling process is not repeated.

Figure 12A:
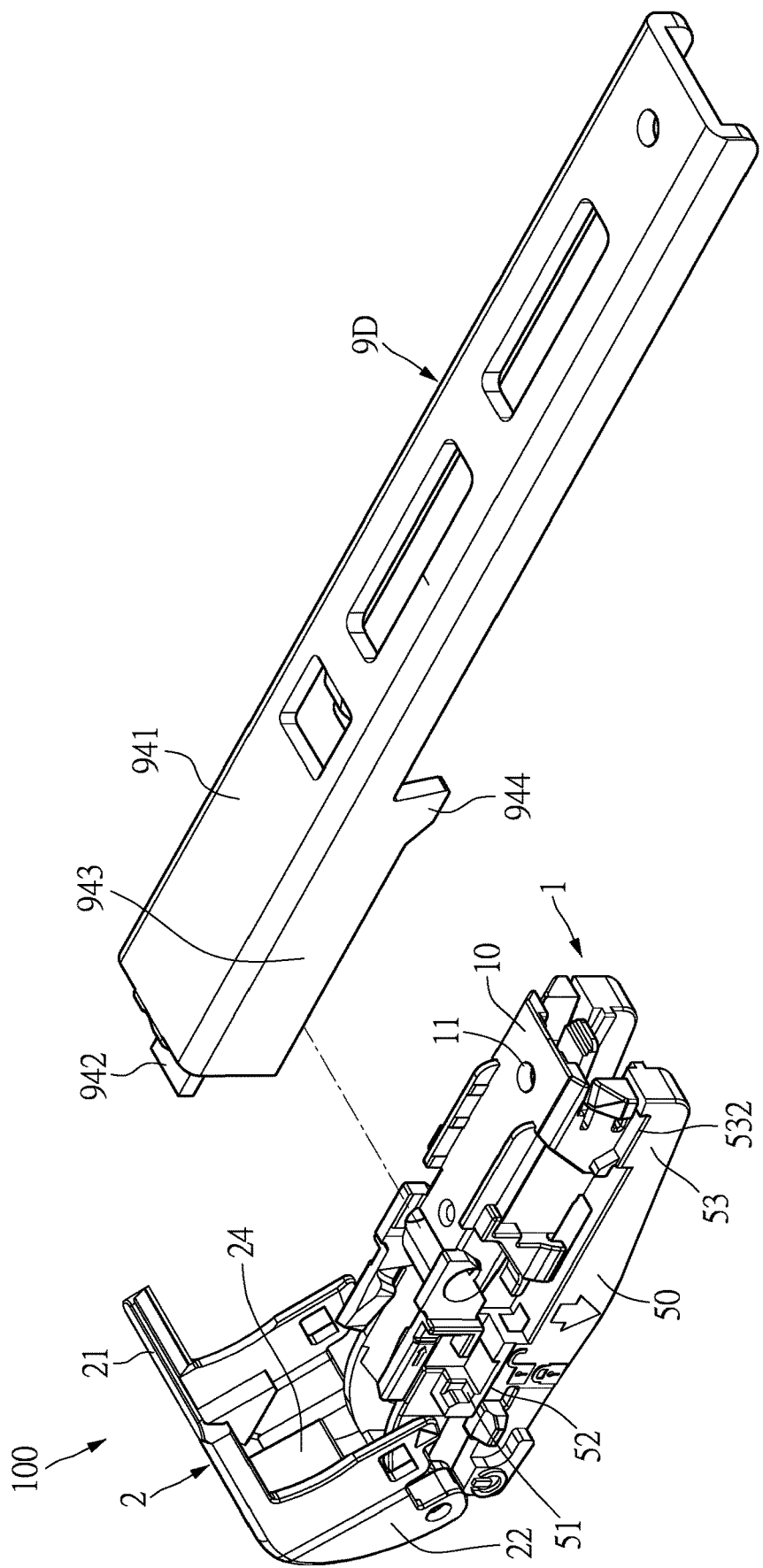
FIG. 12A to FIG. 12C are schematic perspective views of the assembly steps of the wiper adapter according to the present disclosure and a fourth type of wiper arm.
Figure 12B:
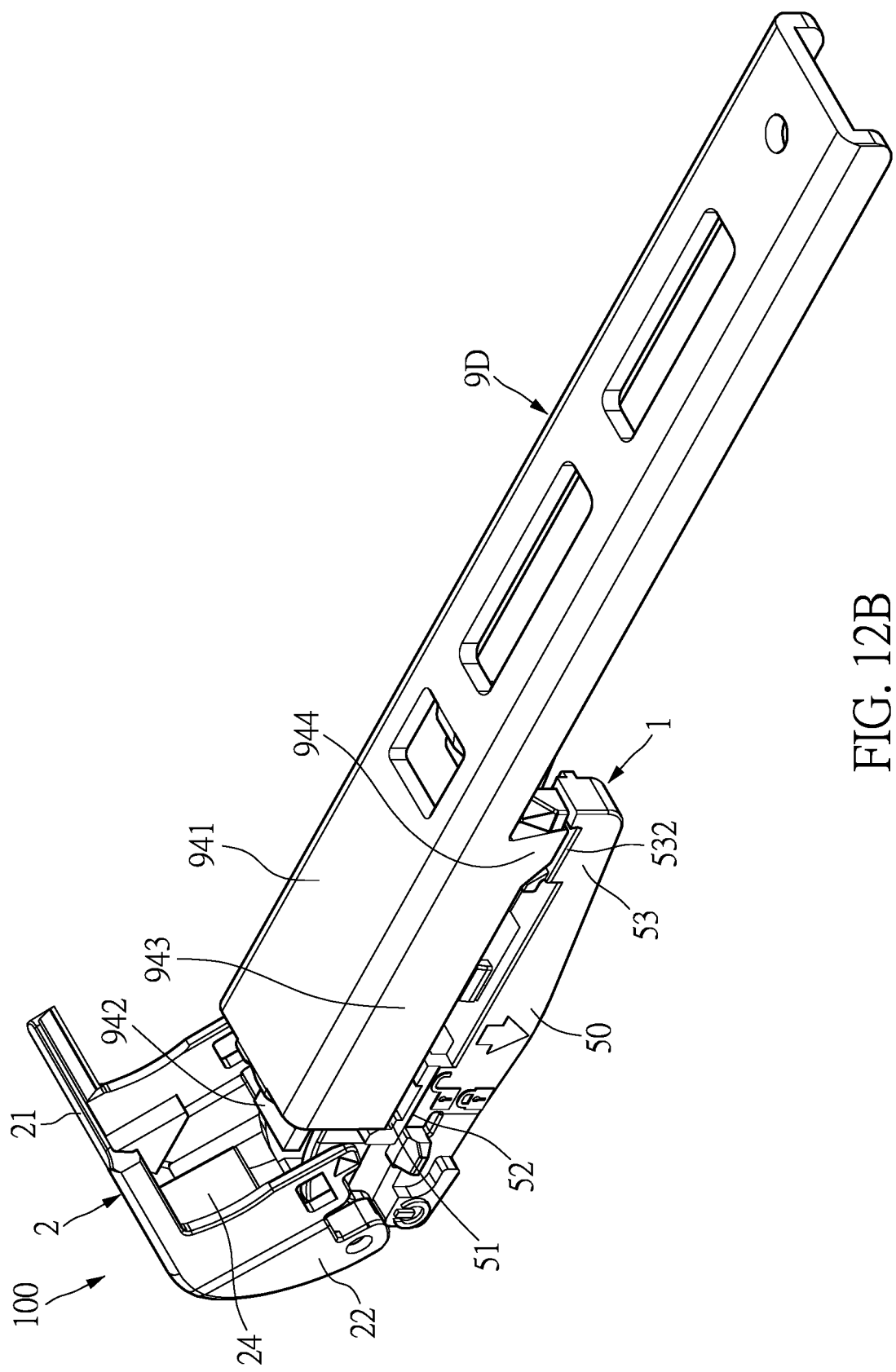
Figure 12C:
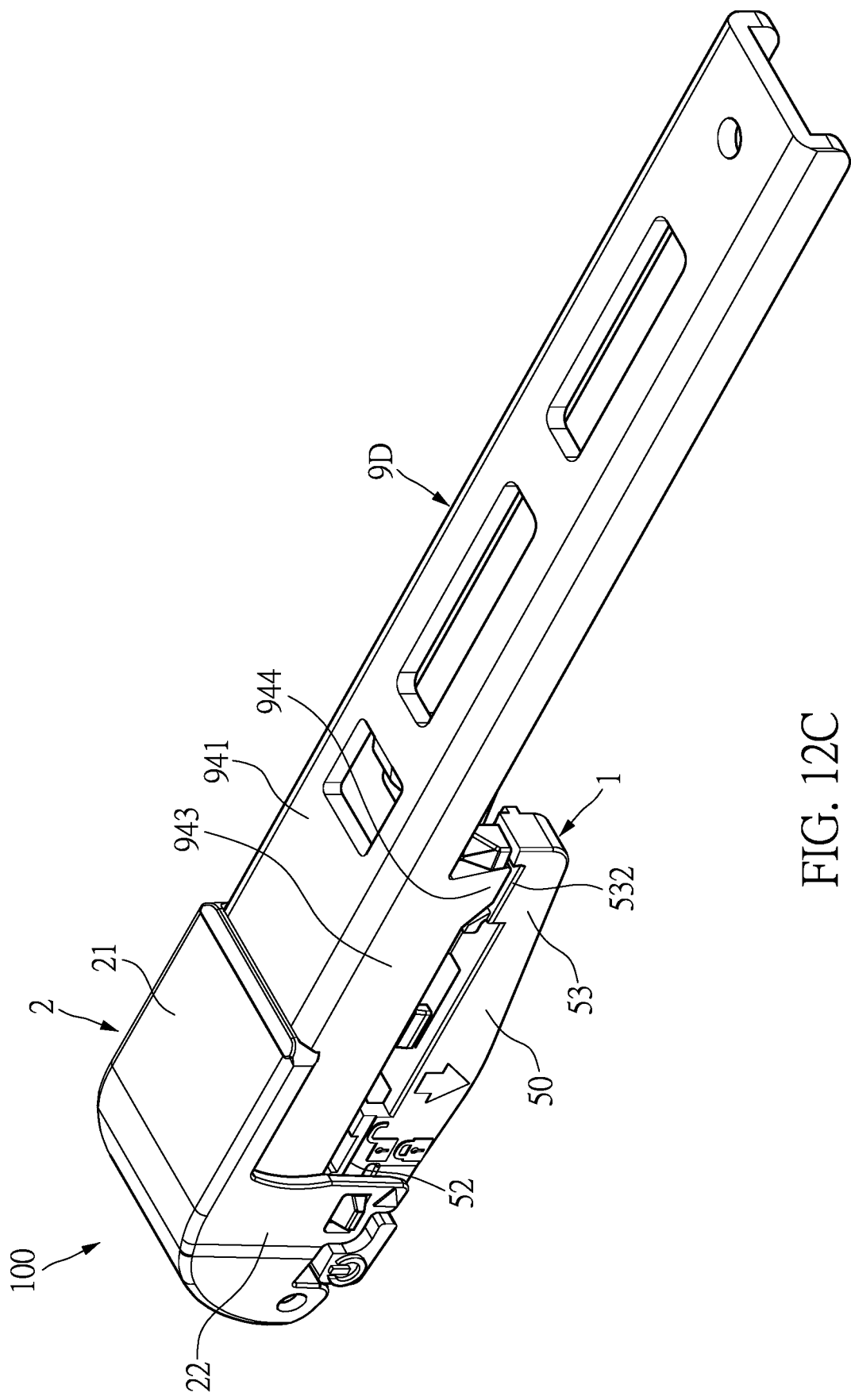

Reference is made to FIG. 12A to FIG. 12C, which depict schematic views of the assembly steps of the wiper adapter and a fourth type of wiper arm 9D. The wiper adapter 100 of the present disclosure can be applied to the fourth type of wiper arm 9D. The wiper arm 9D is a B-type pinch tab wiper arm, which has a substantially-equal width. The wiper arm 9D has a top wall 941, and a pair of side wings 943. A pressed fixing portion 942 is extended from a front end of the top wall 941 of the wiper arm 9D. Each of the side wings 943 is rearward extended with a slanted leg 944. Referring to FIG. 12B, a front corner of the side wing 943 is abutted against the first lower-positioning member 51. In addition, the slanted leg 944 of the wiper arm 9D is blocked by the stepped protrusion 532 of the third lower-positioning member 53 of the bottom wall 50 of the base 1, so as to prevent the wiper arm 9D from moving forward or rearward. After the wiper arm 9D is mounted on the base 1, the shielding cover 2 is rotated to wedge with the base 1, and the pressing member 24 in the shielding cover 2 can press on the pressed fixing portion 942 of the wiper arm 9D. Thus, the wiper arm 9D can be further fixed, to prevent the front end of the wiper arm 9D from being raised up. To remove the wiper arm 9D, a user just presses the pair of releasing elastic arms 54 at the front end of the base 1, and the shielding cover 2 can be released and rotated upward from the base 1. The mounting and dismounting processes are convenient and quick.

Figure 13A:
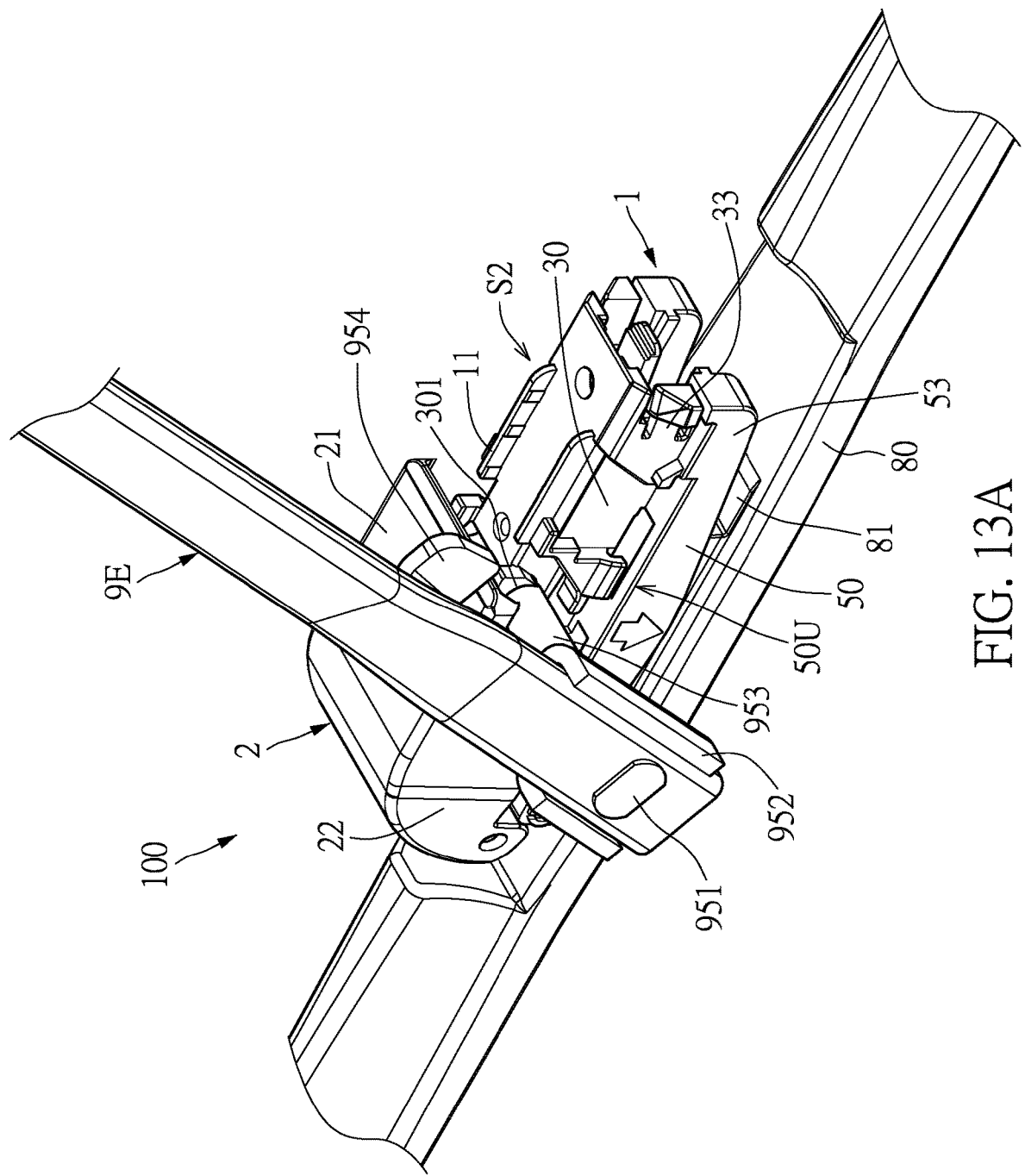
FIG. 13A to FIG. 13B are schematic perspective views of the assembly steps of the wiper adapter according to the present disclosure and a fifth type of wiper arm.
Figure 13B:
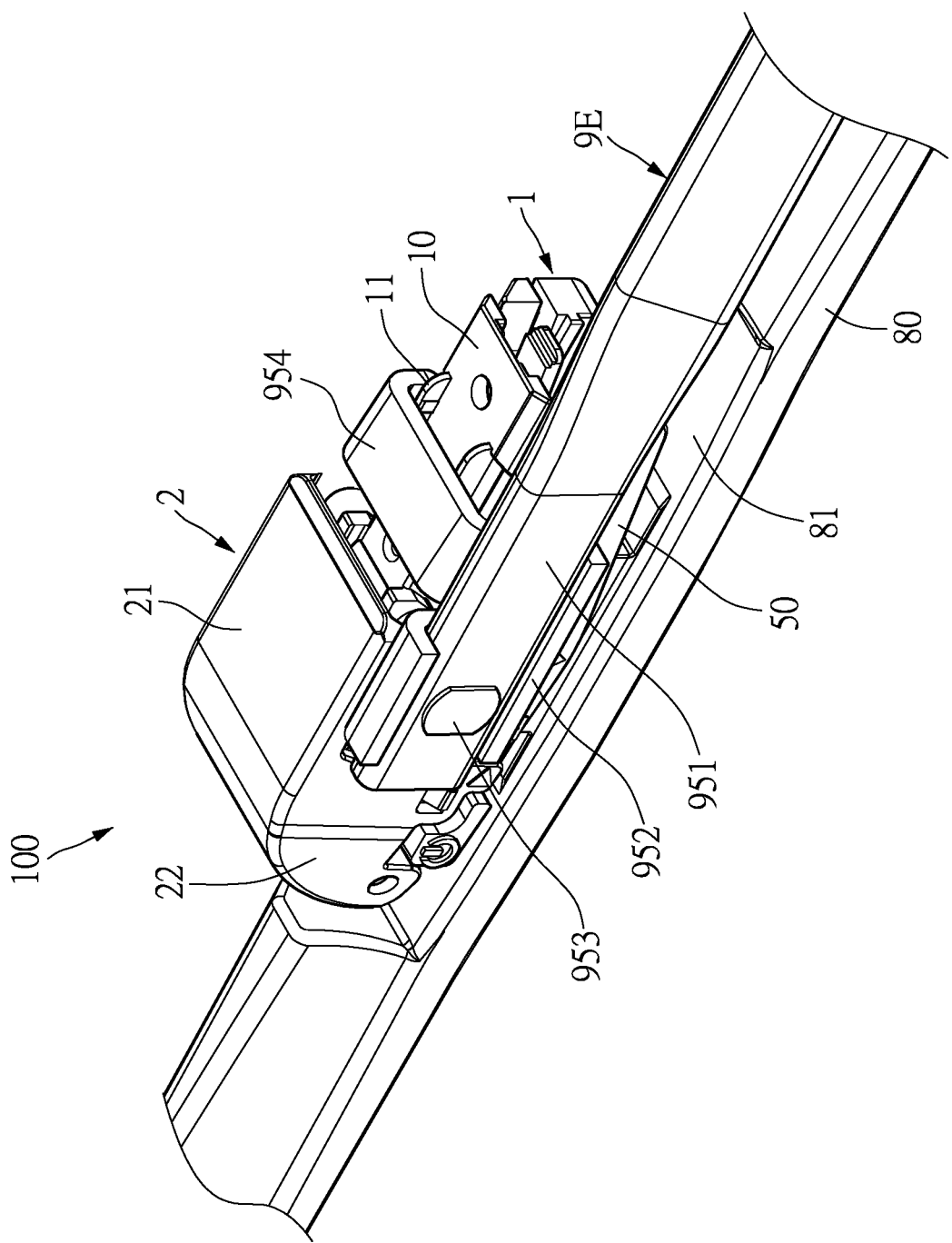

Reference is made to FIG. 13A to FIG. 13B, which depict schematic views of the assembly steps of the wiper adapter according to the present disclosure and a fifth type of wiper arm 9E. The wiper adapter 100 of the present disclosure can be adapted to the fifth type of wiper arm 9E. The wiper arm 9E is a narrow side lock wiper arm, which includes an arm portion 951, a fixing portion 952, an assembling rod 953, and a side fork member 954. A middle part of the base 1 has a transverse through hole 301. After the shielding cover 2 is covered on the base 1, the assembling rod 953 of the wiper arm 9E is aimed and inserted into the transverse through hole 301 at the middle part of the base 1, and then presses downward the wiper arm 9E along the assembling rod 953 toward the rear end of the wiper adapter 100. Therefore, the side fork member 954 of the wiper arm 9E can be embedded with the top wall 10 of the wiper adapter 100, to achieve the assembly and fixing functions. To remove the wiper arm 9E, a user can rotate the wiper arm 9E upward to an up position, and then the assembling rod 953 of the wiper arm 9E can be removed outside the transverse through hole 301.

Figure 13C:
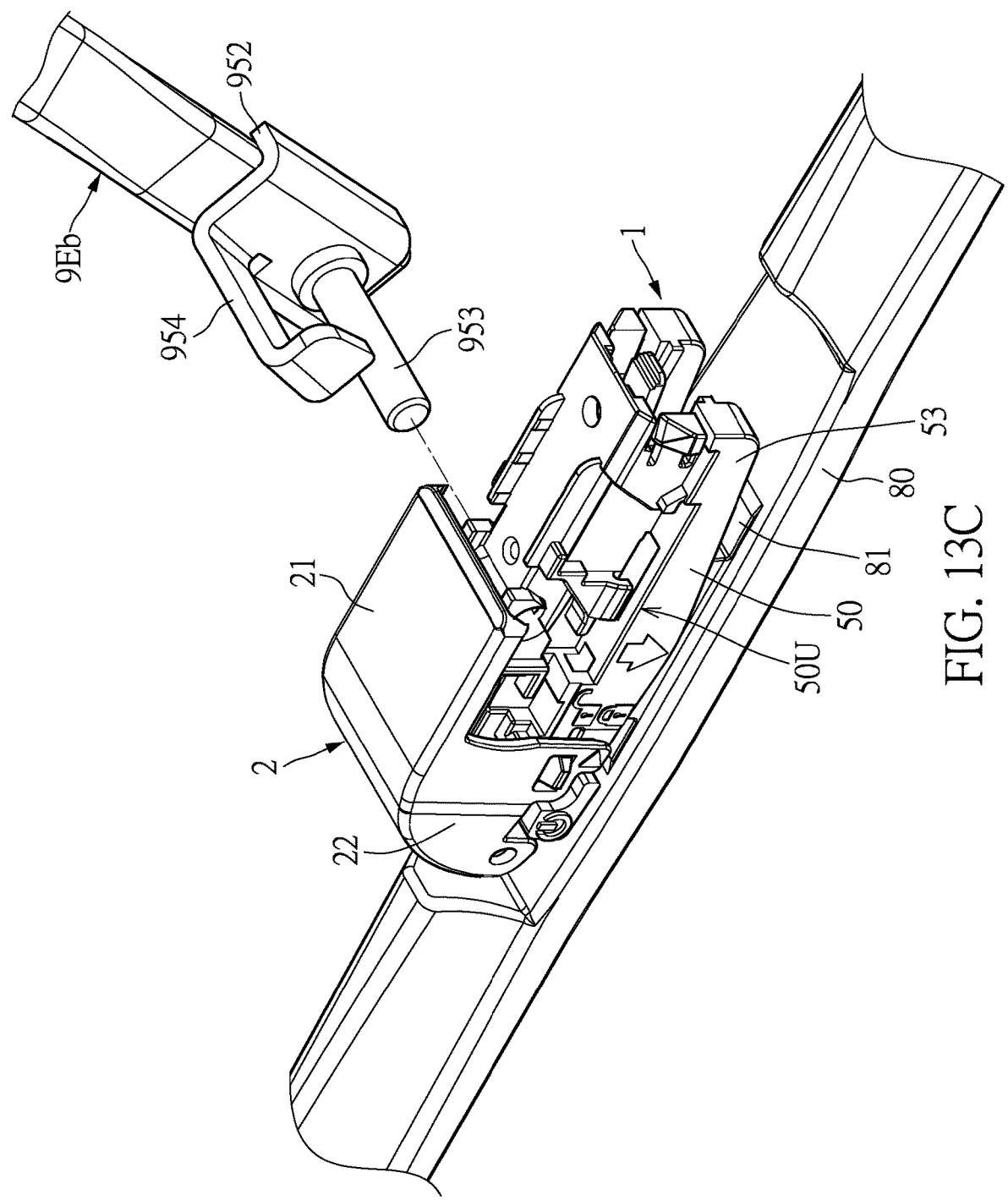
FIG. 13C is a schematic perspective view of a disassembly step of the wiper adapter according to the present disclosure and the fifth type of wiper arm.

Referring to FIG. 13C, an exploded schematic view shows the wiper adapter of the present disclosure that can be applied to a fifth type of right-hand drive wiper arm. The wiper adapter of the present disclosure can be applied to the fifth type of right-hand drive wiper arm 9Eb. The right-hand drive wiper arm 9Eb and left-hand drive wiper arm 9E shown in FIG. 13A are structurally symmetrical. The detailed assembling process is not repeated.

Figure 14A:
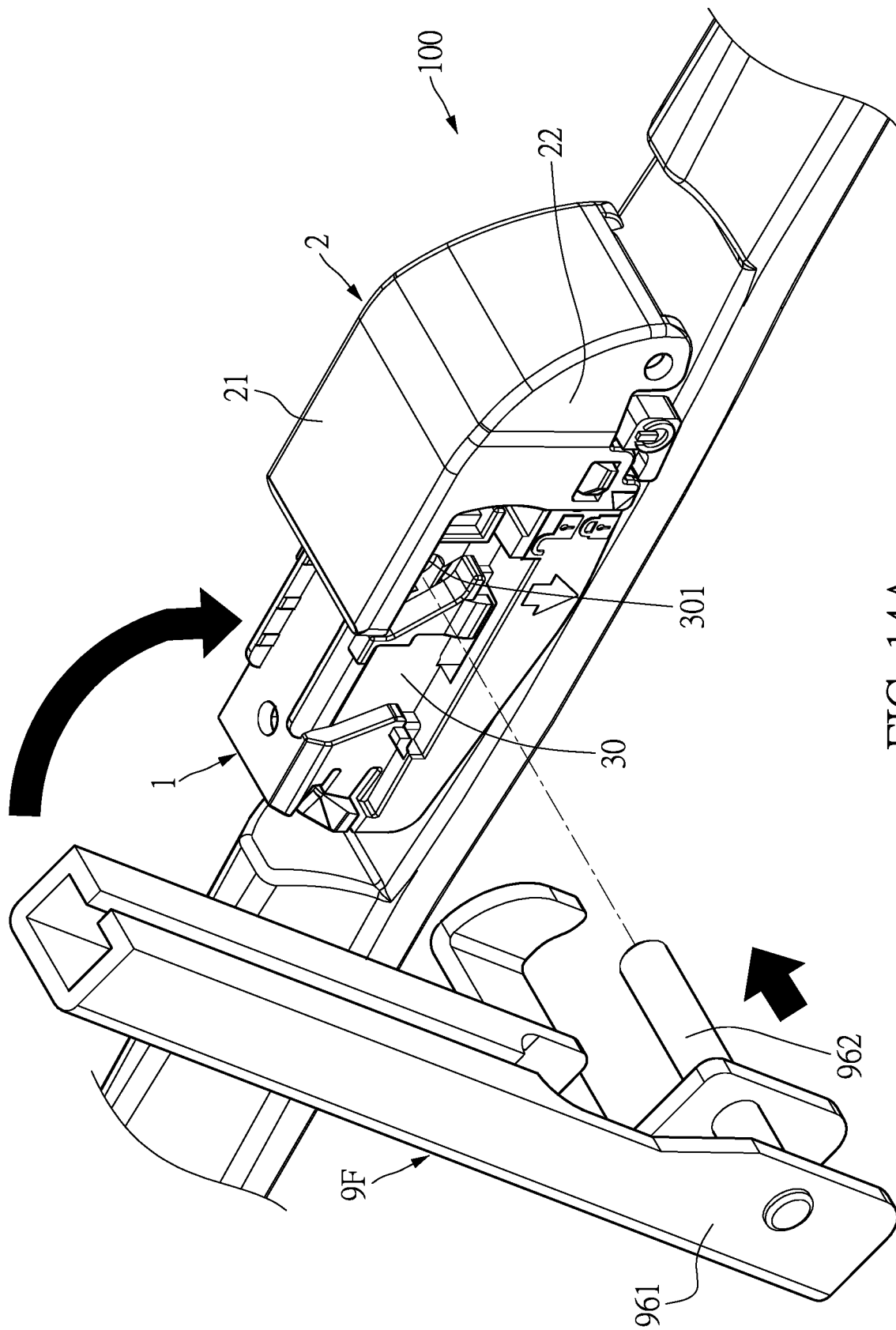
FIG. 14A to FIG. 14B are schematic perspective views of assembly steps of the wiper adapter according to the present disclosure and a sixth type of wiper arm.
Figure 14B:
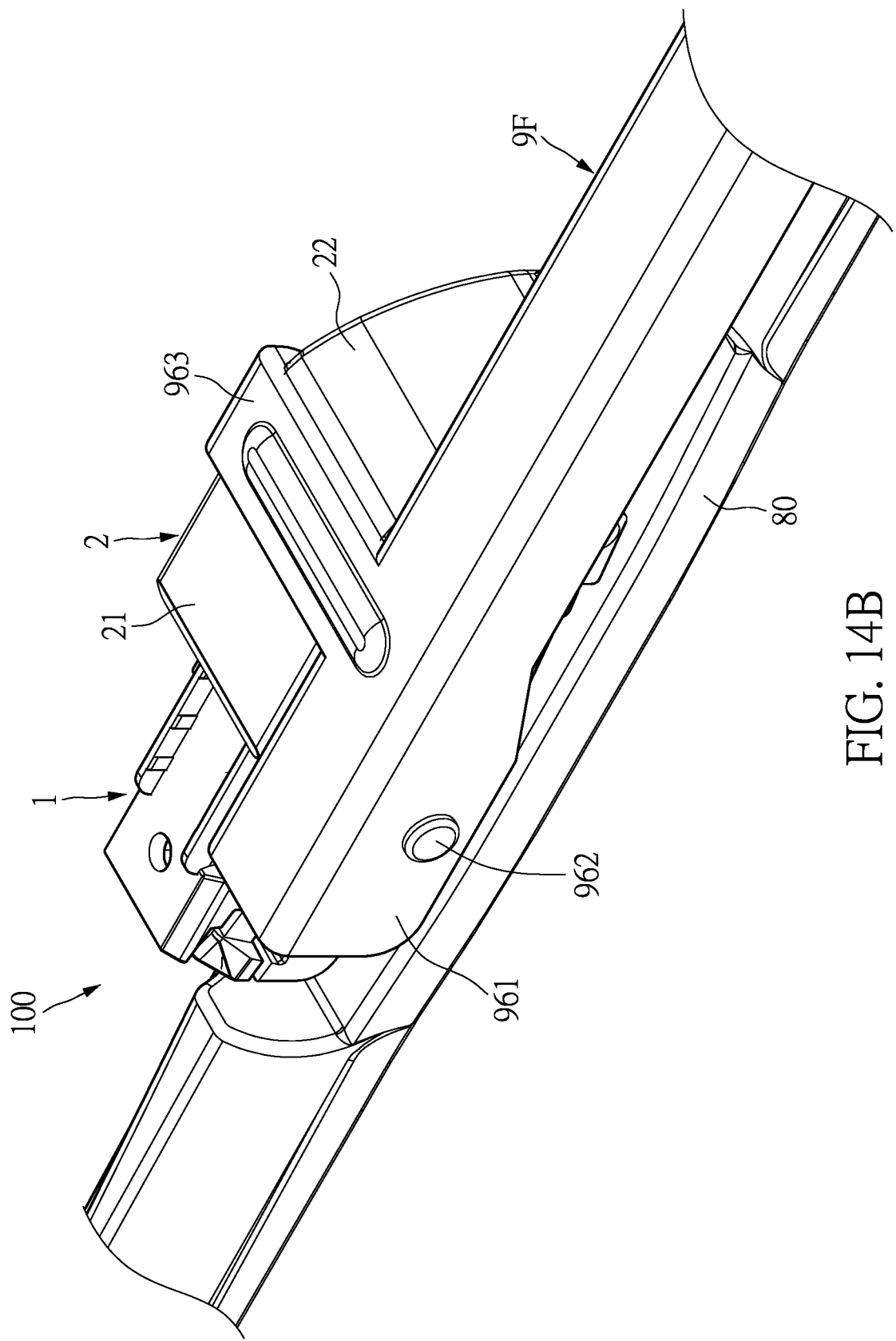

Reference is made to FIG. 14A to FIG. 14B, which depict schematic views of the assembly steps of the wiper adapter according to the present disclosure and a sixth type of wiper arm 9F. The wiper adapter 100 of the present disclosure can be adapted to the sixth type of wiper arm 9F. The wiper arm 9F is a side lock wiper arm, which includes an arm portion 961, an assembling rod 962, and a side fork member 963. A middle part of the base 1 has a transverse through hole 301. After the shielding cover 2 is covered on the base 1, the side fork member 963 of the wiper arm 9F is aimed and inserted into the transverse through hole 301 of the base 1 along the shielding cover 2, and then presses downward the wiper arm 9F toward the shielding cover 2. A width of the shielding cover 2 is matched with a width of the side fork member 963 of the wiper arm 9F and both can be embedded together, to achieve the assembly and fixing functions. To remove the wiper arm 9F, a user can rotate the wiper arm 9F upward to an up position, and then the wiper arm 9F can be removed outside the transverse through hole 301.

Figure 14C:
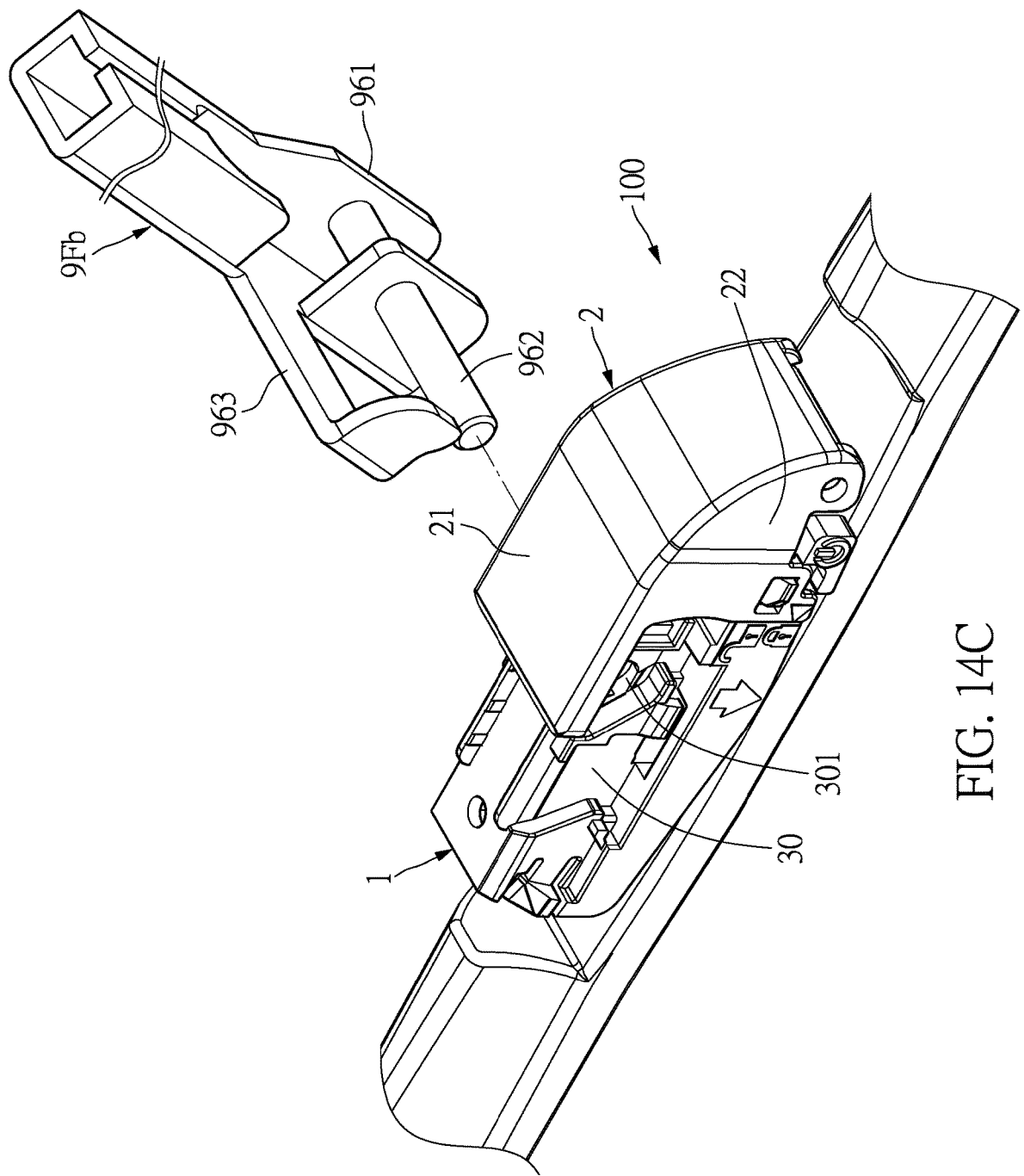
FIG. 14C is a schematic perspective view of a disassembly step of the wiper adapter according to the present disclosure and the sixth type of wiper arm.
Figure 15A:
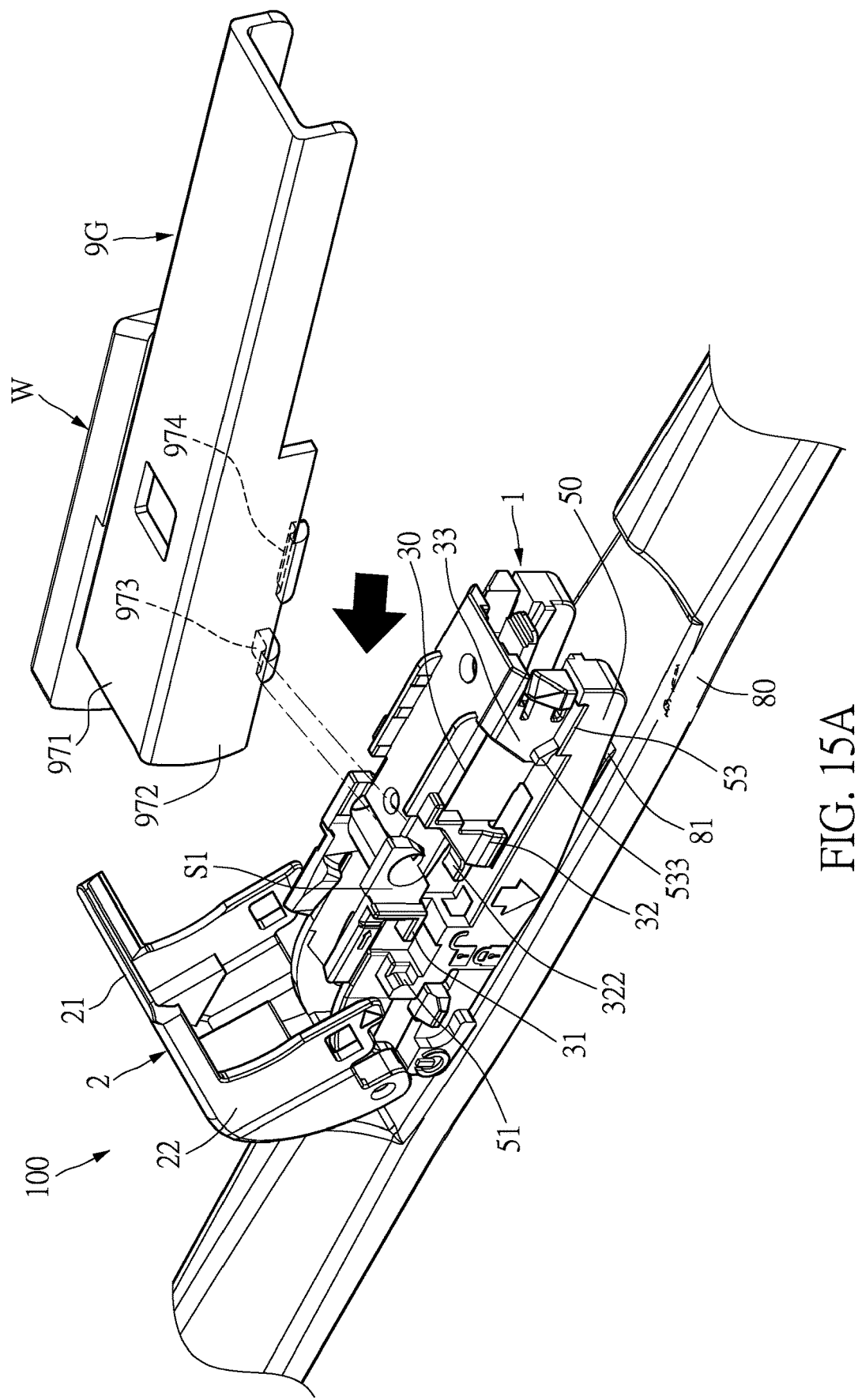
Figure 15B:
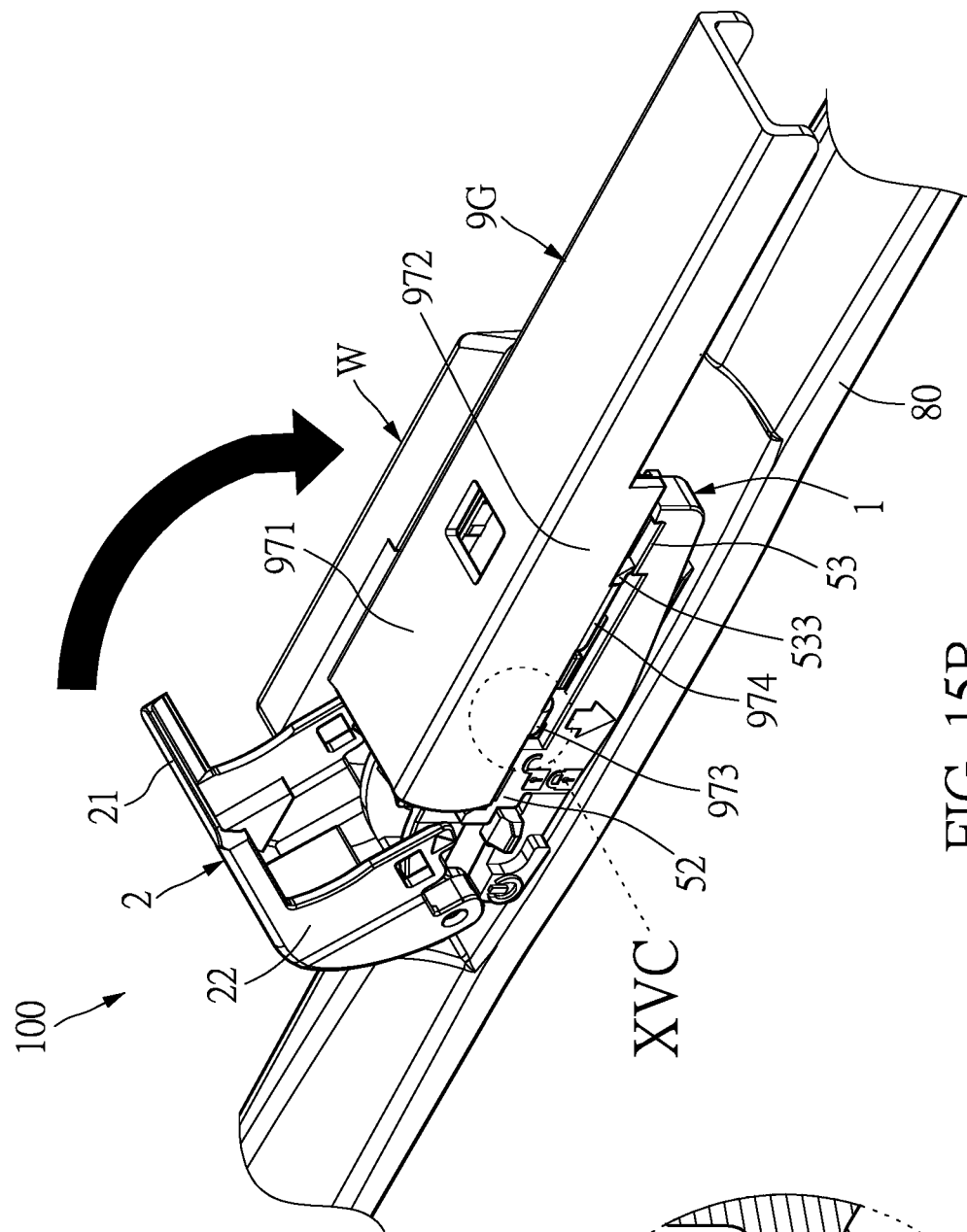
Figure 15C:
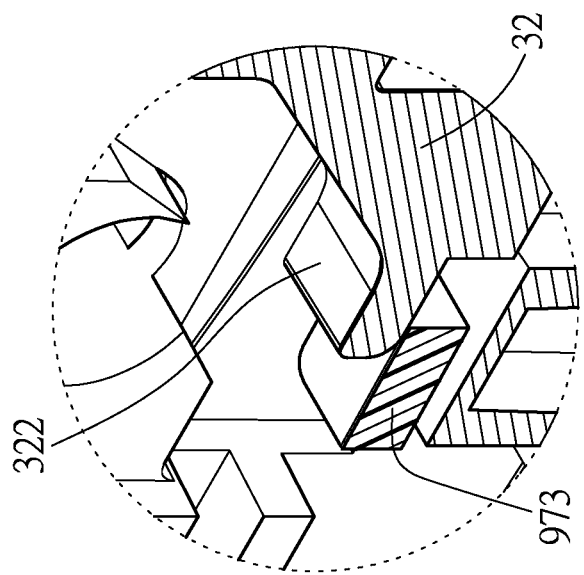
Figure 15D:
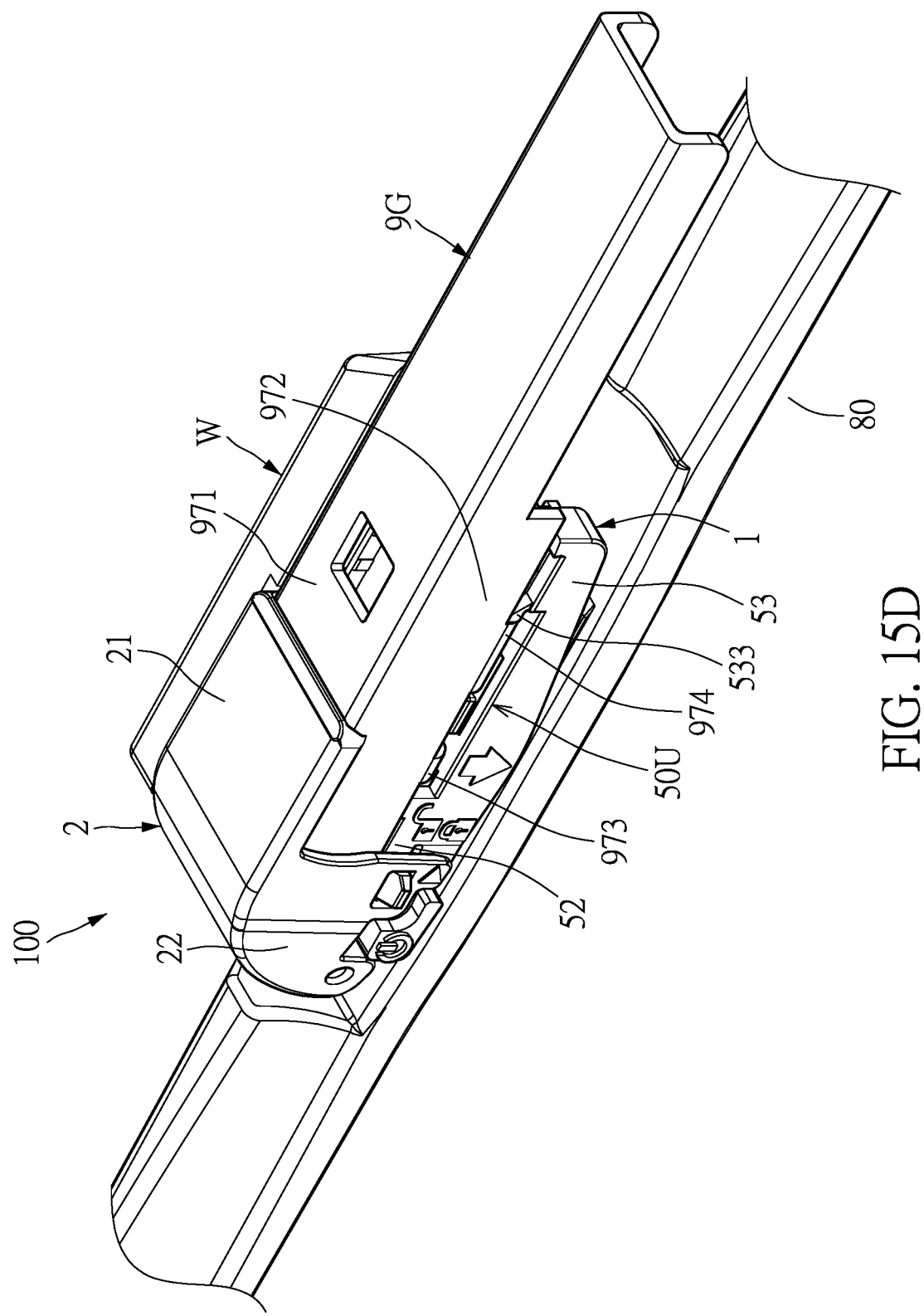

In addition, referring to FIG. 14C, an exploded schematic view shows the wiper adapter 100 of the present disclosure that can be applied to a sixth type of right-hand drive wiper arm 9Fb.

Reference is made to FIG. 15A to FIG. 15D, which depict schematic views of the assembly steps of the wiper adapter according to the present disclosure and a seventh type of wiper arm 9G. The wiper adapter 100 of the present disclosure can be adapted to the seventh type of wiper arm 9G. The wiper arm 9G is a small (16 mm) push bottom type of wiper arm with a spray accessory kit W. The wiper arm 9G includes a top wall 971, and a pair of side walls 972 downward extended from a part of the top wall 971. Each of the side walls 972 has a front locking tab 973 and a rear locking tab 974. Two sides of the base 1 have a front limiting space S1 and a rear limiting space S2, respectively. The front locking tab 973 and the rear locking tab 974 of the wiper arm 9G enter in a front limiting space S1 and a rear limiting space S2, respectively. Then, to pull the wiper arm 9G rearward, the front locking tab 973 is engaged with the lower horizontal portion 322 of the second side-positioning member 32, and the rear locking tab 974 is engaged with the hooking block 533 of the third lower-positioning member 53. On the one hand, the wiper arm 9G can be stopped from being moved forward, or rearward, or upward. On the other hand, such structure can prevent the wiper arm from being twisted during usage. After the wiper arm 9G is mounted on the base 1, the shielding cover 2 is rotated to and engaged with the base 1. The shielding cover 2 covers a part of the wiper arm 9G, so to fix the wiper arm 9G and prevent it from moving forward. To remove the wiper arm, a user can press the pair of releasing elastic arms 54 at a front end of the base 1, and then the shielding cover 2 is loosened and can be opened from the base 1. The mounting and dismounting processes are convenient and quick.

Reference is made to FIG. 16A to FIG. 16D, which depict schematic views of the assembly steps of the wiper adapter according to the present disclosure and an eighth type of wiper arm 9H. The wiper adapter 100 of the present disclosure can be adapted to the eighth type of wiper arm 9H. The wiper arm 9H is a large (19 mm) push bottom type of wiper arm. The wiper arm 9H includes a top wall 981, and a pair of side walls 982 downward extended from a part of the top wall 981. A width of the wiper arm 9H is substantially equal to a width of the shielding cover 2. The side wall 982 has an inner bending portion 983, and a locking tab 984 formed at a front end of the inner bending portion 983. The locking tab 984 of the wiper arm 9H can be assembled to the wiper adapter 100 from the front limiting space S1, and can be engaged to the lower horizontal portion 322 of the second side-positioning member 32, to prevent it from being twisted or bent during using. In addition, the stepped protrusion 532 of the third lower-positioning member 53 formed on the bottom wall 50 of the base 1 can be hooked with a rear end of the inner bending portion 983. After the wiper arm 9H is assembled with the base 1, the shielding cover 2 is rotated to engage with the base 1. A part of the upper covering board 21 of the shielding cover 2 covers a front end of the wiper arm 9G, so that the wiper arm 9G is fixed to prevent it from moving forward. The side walls 982 of the wiper arm 9G are aligned to the side covering board 22 of the shielding cover 2. To remove the wiper arm, a user can press the pair of releasing elastic arms 54 at a front end of the base 1, and then the shielding cover 2 is loosened and can be opened from the base 1. The mounting and dismounting processes are convenient and quick.

Figure 16A:
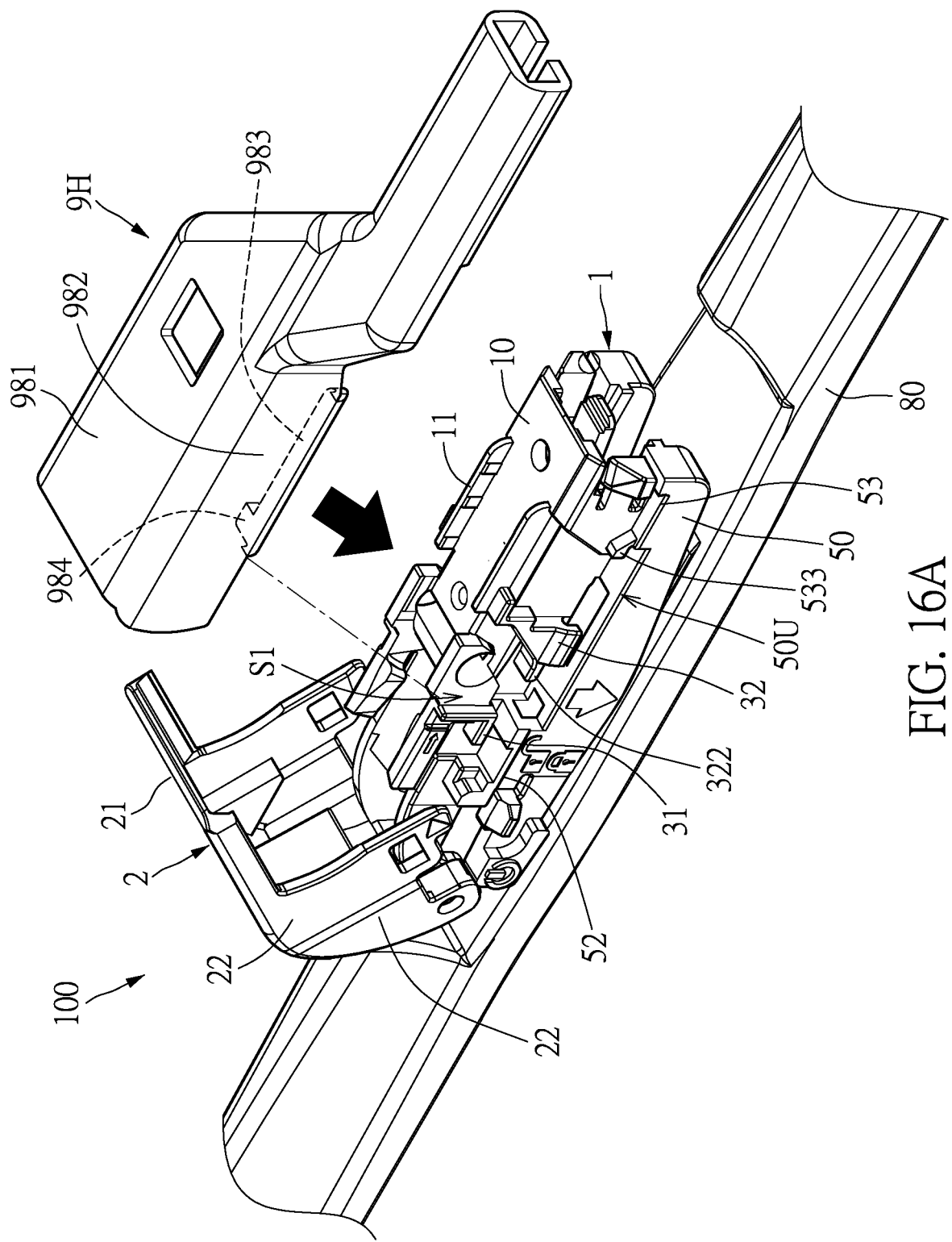
Figure 16B:
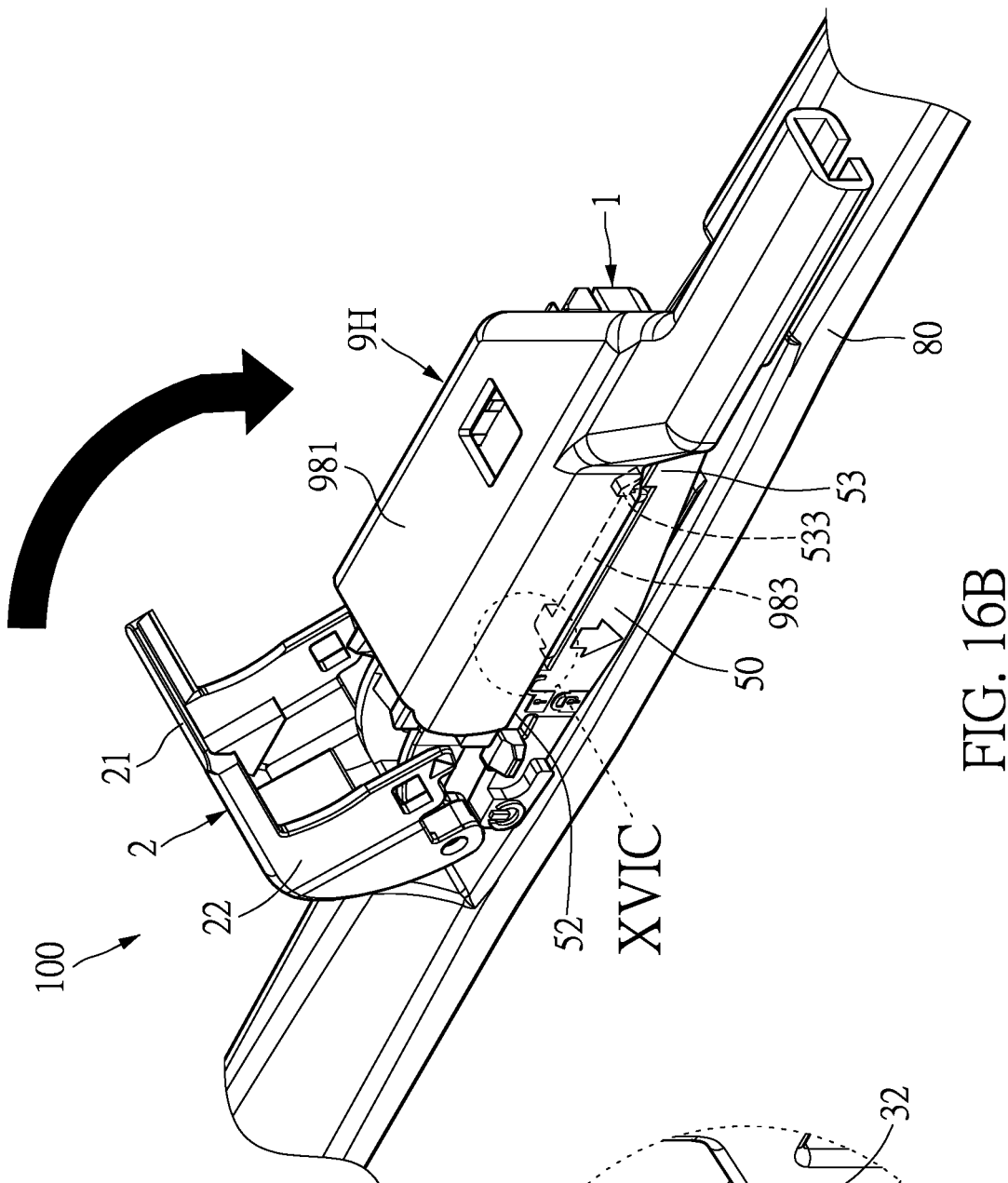
Figure 16C:
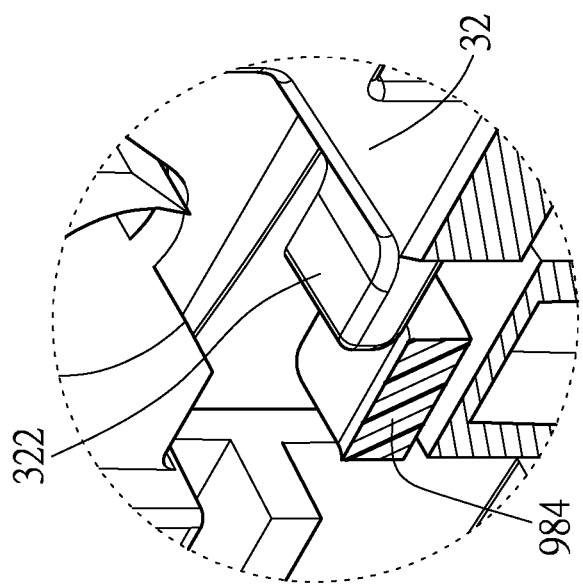
Figure 16D:
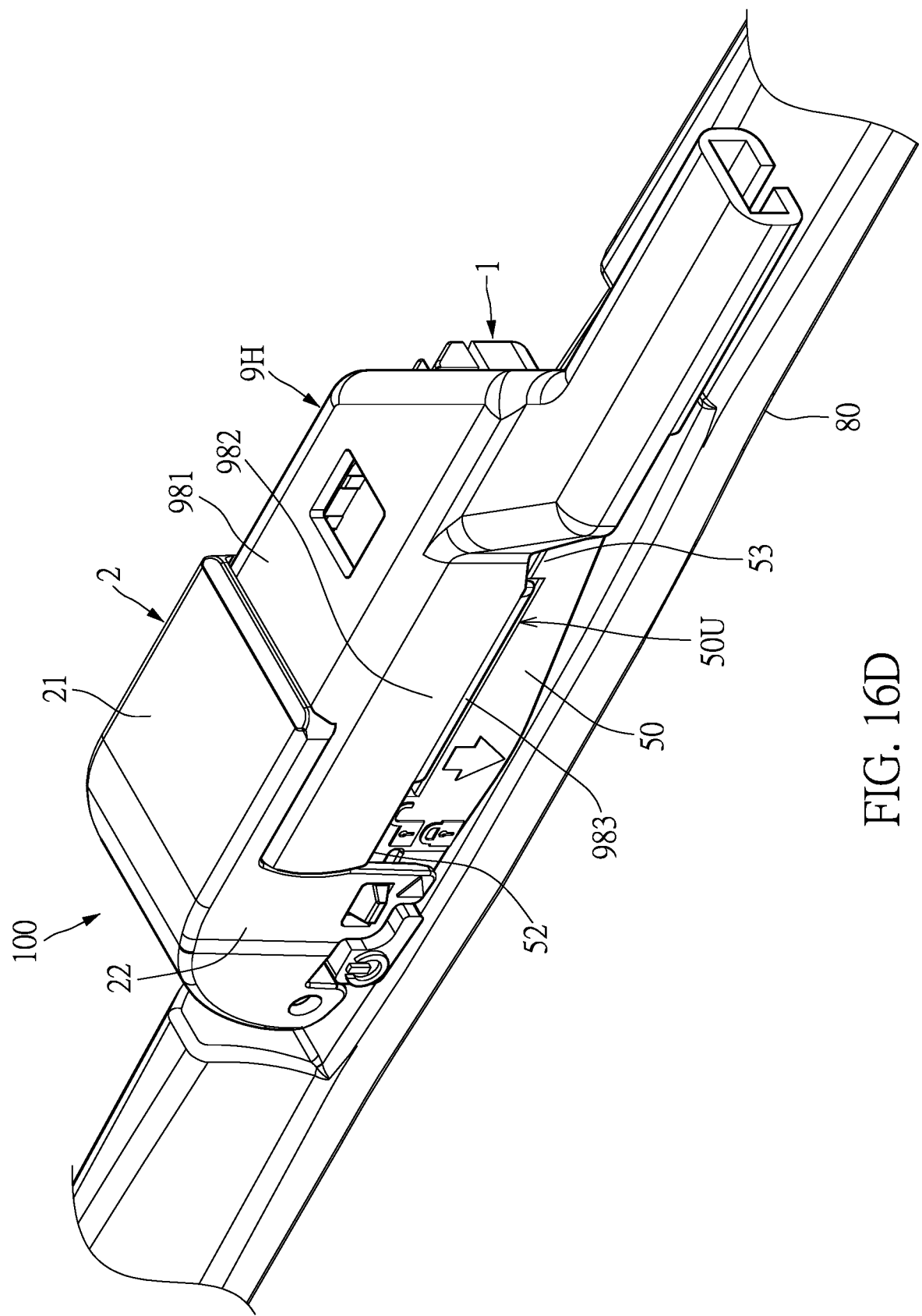
Figure 16E:
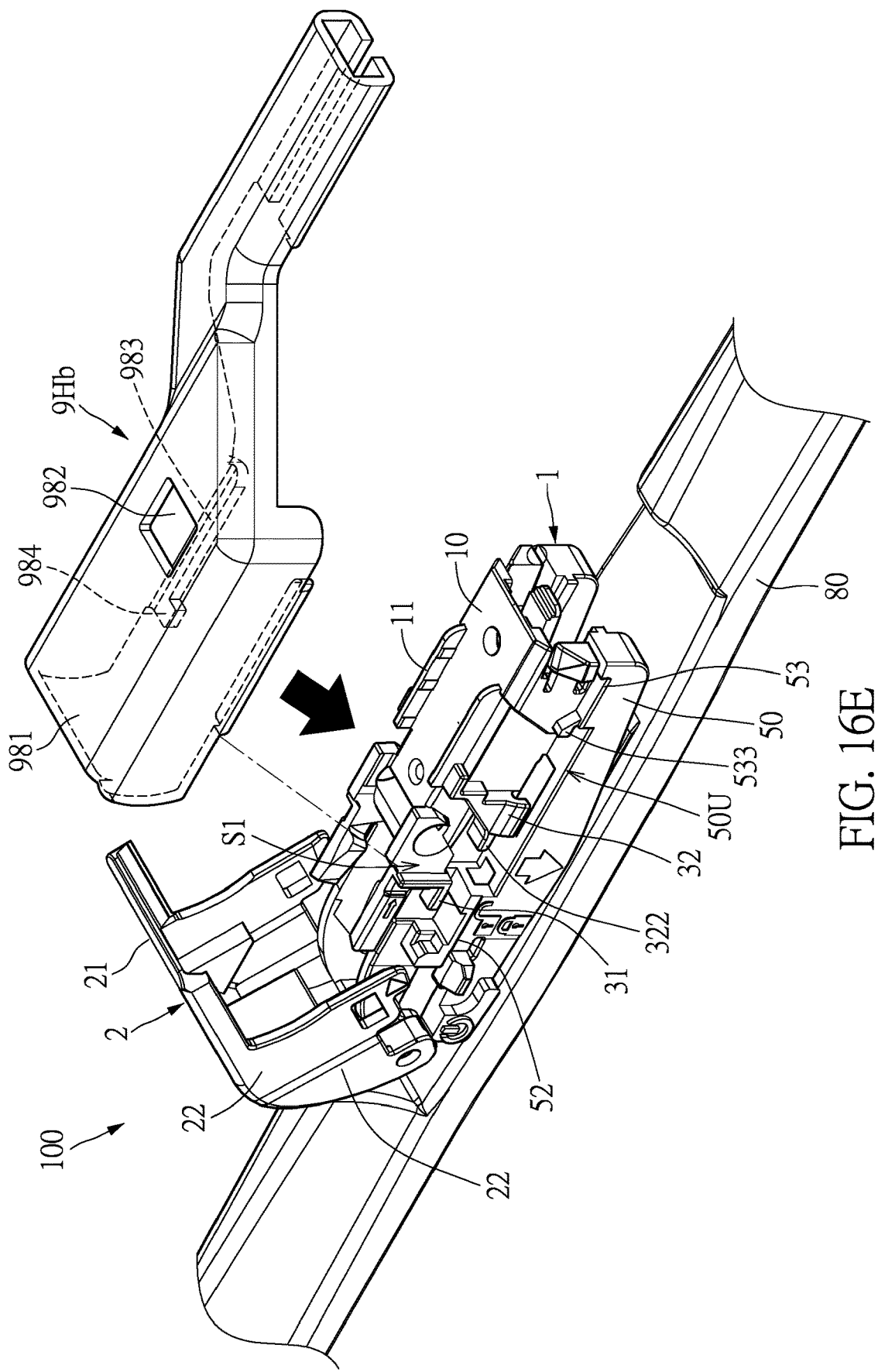
FIG. 16E is a schematic perspective view of a disassembly step of the wiper adapter according to the present disclosure and the eighth type of right-hand drive wiper arm.

Reference is made to FIG. 16E, which is an exploded view of the wiper adapter of the present disclosure and an eighth type of right-hand driver wiper arm. This embodiment shows the present disclosure can be applied to the eighth type of right-hand drive wiper arm 9Hb. The wiper arm 9Hb and the wiper arm 9H in FIG. 16A are structurally symmetrical, and the detailed assembling process is not repeated.

Figure 17A:
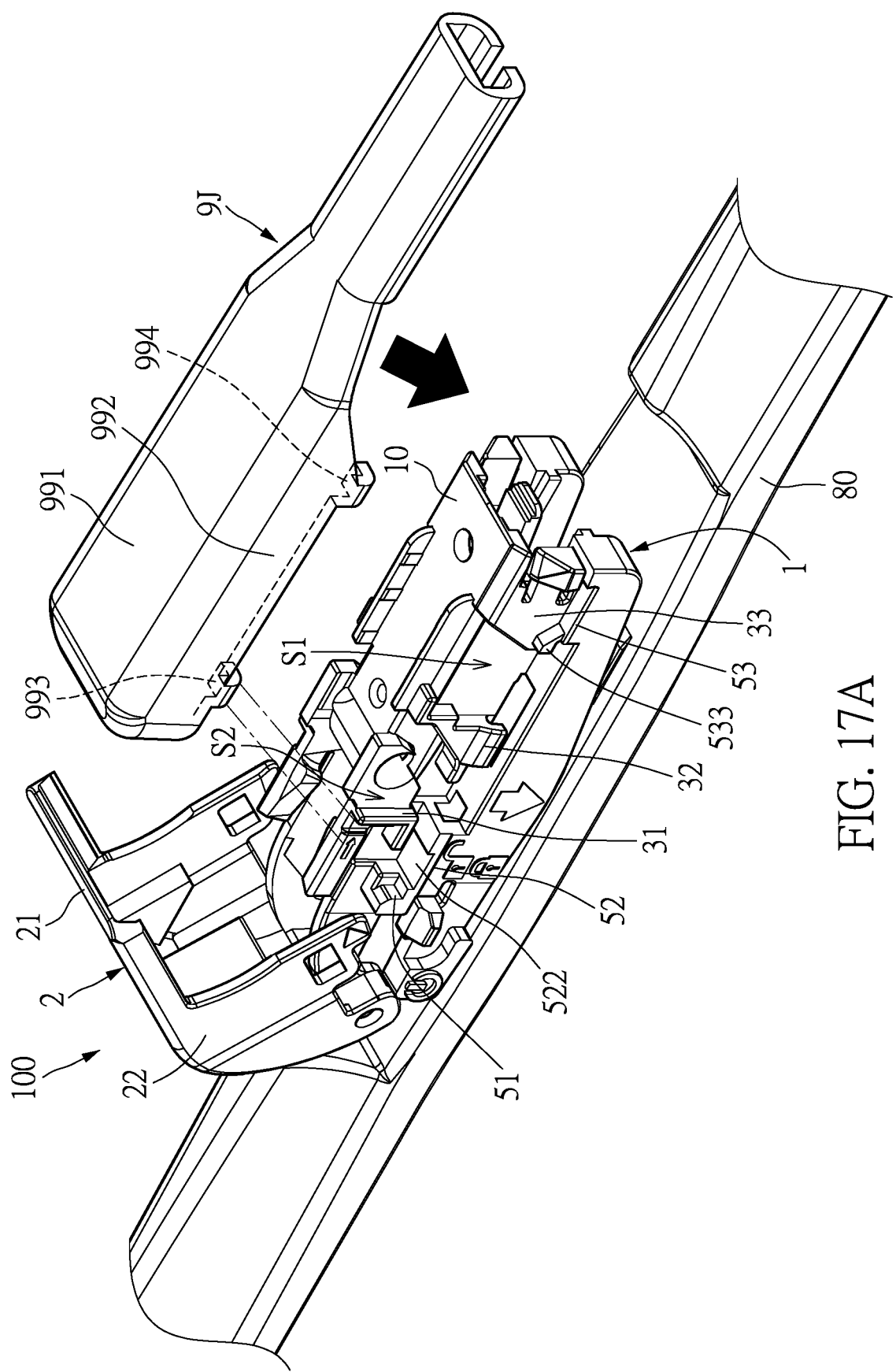
FIG. 17A to FIG. 17C are schematic perspective views of the assembly steps of the wiper adapter according to the present disclosure and a ninth type of wiper arm.
Figure 17B:
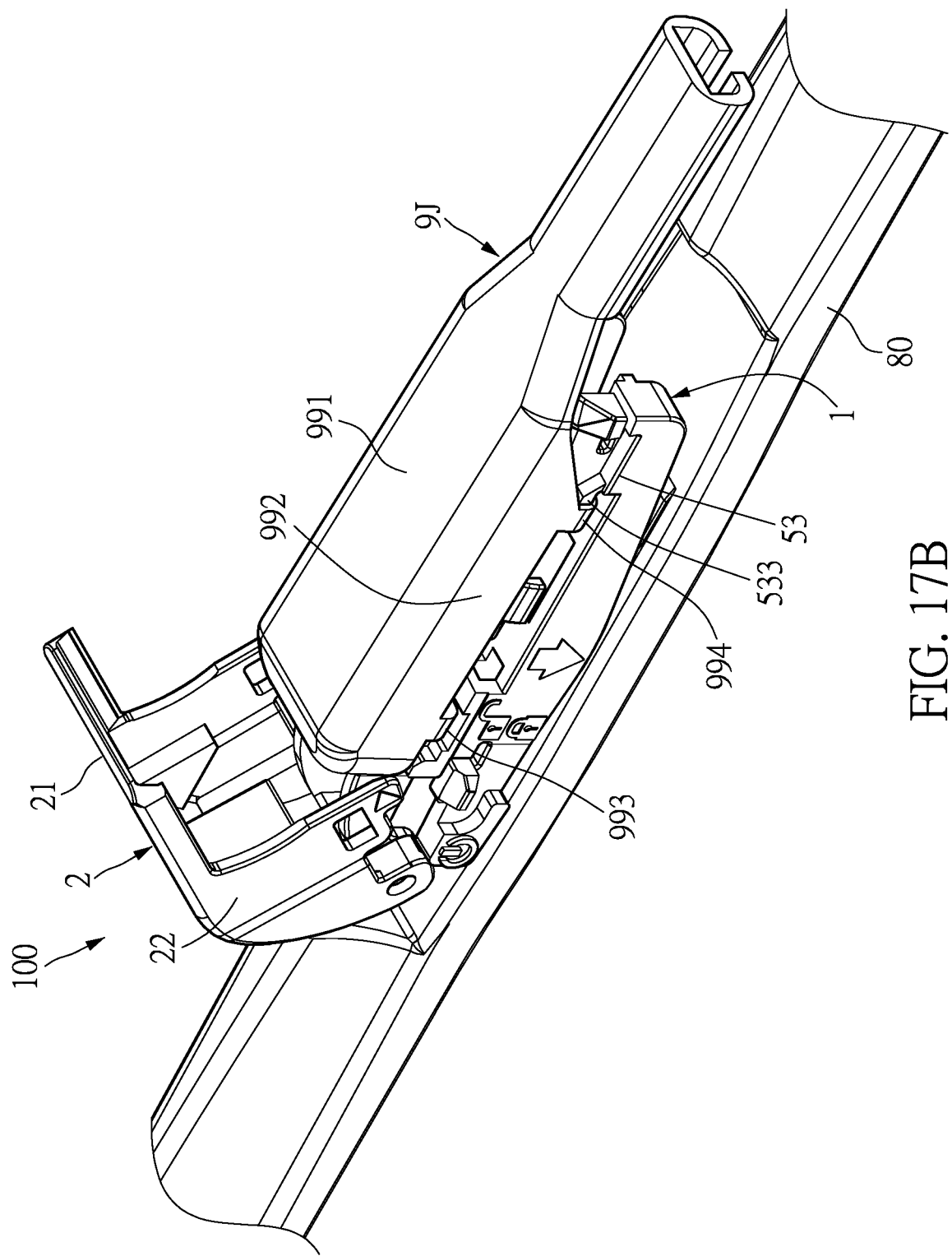
Figure 17C:
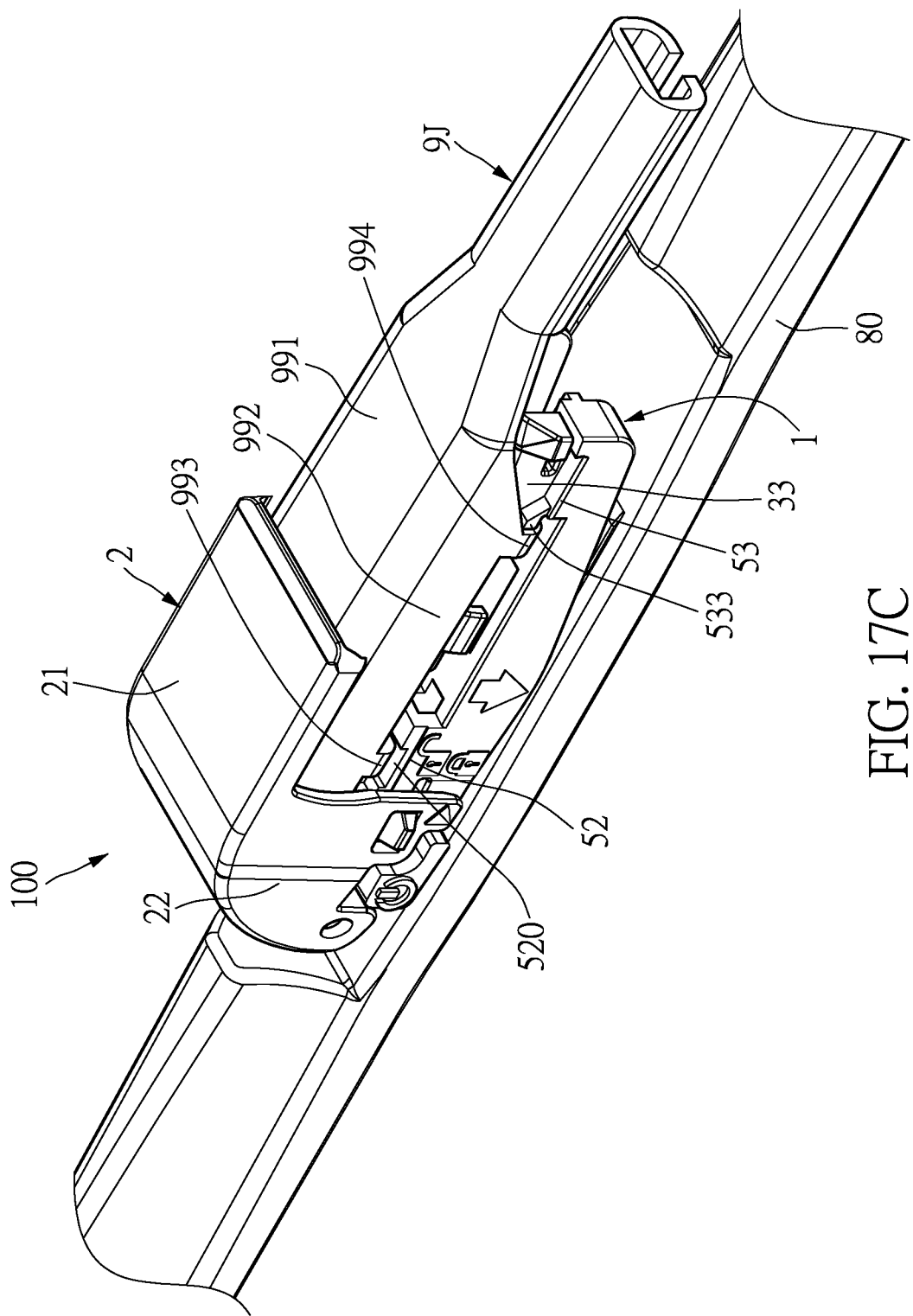

Reference is made to FIG. 17A to FIG. 17C, which depict schematic views of the assembly steps of the wiper adapter and a ninth type of wiper arm 9J. The wiper adapter 100 of the present disclosure can be applied to the ninth type of wiper arm 9J. The wiper arm 9J is a central lock type of wiper arm. The wiper arm 9J has a top wall 991 and a pair of side walls 992. Each side wall 992 has a front hook 993 and a rear hook 994. The second lower-positioning member 52 at a front end of the base 1 has a top limiting slot 520 that can be used to limit the front hook 993 of the wiper arm 9J. The rear hook 994 of the wiper arm 9J can be rearward wedged to the hooking block 533 of the third lower-positioning member 53, so as to prevent the wiper arm 9J from twisting during use. After the wiper arm 9J is assembled with the base 1, the shielding cover 2 is rotated and clipped the base 1, so as to fix the wiper arm 9J and prevent the wiper arm from moving forward. When dismounting, a user can press the pair of releasing elastic arms 54 at the front end of the base 1. And then, the shielding cover 2 can be loosened from the base 1. The mounting and dismounting processes are convenient and quick.

Second Embodiment

Figure 18:
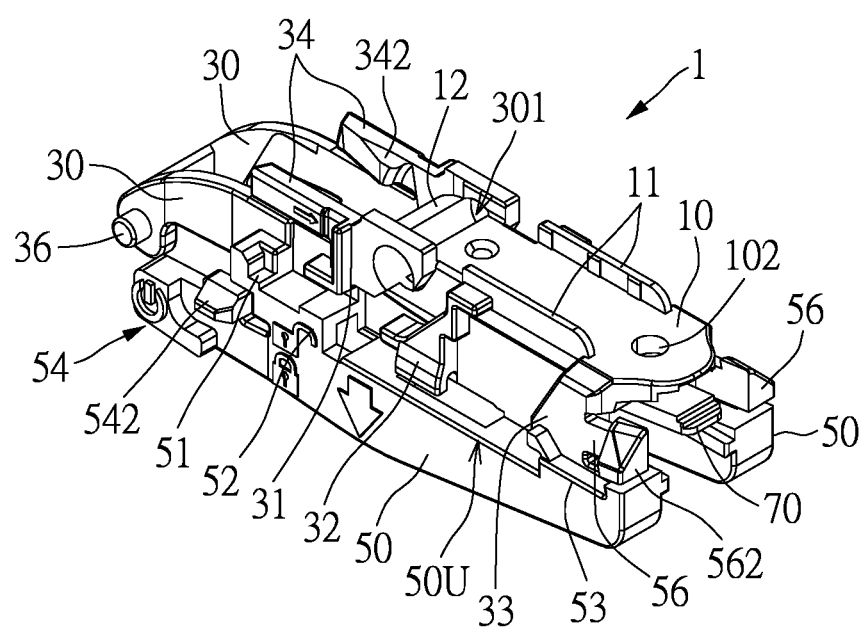
FIG. 18 is a schematic perspective view of the wiper adapter of a second embodiment according to the present disclosure.

Reference is made to FIG. 18, which is a perspective view of the wiper adapter of a second embodiment according to the present disclosure. The difference between the wiper adapter 100 of this embodiment and the above embodiment is that, the base 1 has a top wall 10a, and two corners of a rear end of the top wall 10a have a chamfered shape, respectively. The shape of the chamfer can be arc, or other shape. The wiper adapter of this embodiment has an advantage that it can be adapted to the wiper arm with a gradual-taper shape.

Beneficial Effects of the Embodiments

In conclusion, in the wiper adapter provided by the present disclosure, by virtue of a plurality of L-shaped structures on the base, more resources can be saved, and the trend of environmental protection is fulfilled.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wiper adapter, comprising:

a base having a top wall, a pair of side walls, and a pair of bottom walls, the pair of side walls being respectively connected to two sides of the top wall along a longitudinal direction, the pair of bottom walls being respectively connected to a bottom of the pair of side walls in a lateral direction, the two sides of the top wall each including a limiting wall extending upward, wherein a transverse through hole passes through the pair of side walls and is located at a central position of the wiper adapter; and wherein at least one of the side walls includes a first side-positioning member, a second side-positioning member, and a third side-positioning member, respectively having a first L-shaped configuration, the first side-positioning member is formed adjacent to a front end of the top wall, the third side-positioning member is formed adjacent to a rear end of the top wall, the second side-positioning member is arranged between the first side-positioning member and the second side-positioning member;

wherein a front limiting space is defined between the first side-positioning member and the second side-positioning member, and a rear limiting space is defined between the second side-positioning member and the third side-positioning members;

wherein at least one of the bottom walls includes a first lower-positioning member, a second lower-positioning member, and a third lower-positioning member, respectively having a second L-shaped configuration, the second lower-positioning member is arranged below the first side-positioning member, the first lower-positioning member is arranged before the second lower-positioning member, and the third lower-positioning member is arranged below the third side-positioning member;

wherein a lower holding groove is defined between the second lower-positioning member and the third lower-positioning member;

wherein each of the L-shaped configurations forms an included angle of 90 degrees;

said L-shaped configurations are arranged in an interrelated manner to cooperatively define multiple limiting spaces configured to accommodate wiper arms having at least two distinct cross-sectional profiles, so as to enhance axial stability and adaptability without requiring interchangeable components;

a shielding cover connecting to a front end of the pair of side walls, a receiving slot being formed between the shielding cover and the base, wherein the receiving slot is configured to stop a displacement of the wiper arms having a top wall.

2. The wiper adapter according to claim 1, wherein the top wall has a limiting hole, and the limiting hole is adjacent to a rear end of the top wall.

3. The wiper adapter according to claim 2, wherein the wiper adapter further includes a limiting positioning member located at a lower end of the top wall, the limiting positioning member includes a fixing end and a free end, the fixing end is connected to an inner side of the pair of side walls, and the free end extends rearward beyond the top wall.

4. The wiper adapter according to claim 1, wherein the base further includes a pair of latching elastic arms, the pair of latching elastic arms are arranged in front of the top wall and extend toward the shielding cover along the longitudinal direction, and each of the latching elastic arms has a locking protrusion formed at an inner side thereof.

5. The wiper adapter according to claim 1, wherein the first side-positioning member includes a first vertical portion and a first horizontal portion, the first horizontal portion is connected to a bottom end of the first vertical portion and faces toward the shielding cover, and a distance is arranged between the first horizontal portion and a corresponding one of the bottom walls.

6. The wiper adapter according to claim 1, wherein the second side-positioning member includes an upper horizontal portion, a lower horizontal portion, a slope portion, and a rear bump, the slope portion is connected between the upper horizontal portion and the lower horizontal portion, the upper horizontal portion extends rearward, the lower horizontal portion extends forward, and the rear bump is located at one side of the slope portion and protrudes rearward.

7. The wiper adapter according to claim 1, wherein the third side-positioning member includes a stepped protrusion, and a bottom of the stepped protrusion is higher than a corresponding one of the bottom walls.

8. The wiper adapter according to claim 1, wherein the base further includes a pair of rear elastic arms, the pair of rear elastic arms are respectively connected to the pair of side walls, and each of the rear elastic arms has an outward restricting portion.

9. The wiper adapter according to claim 1, wherein the second lower-positioning member protrudes from a side edge of the lower holding groove toward the first side-positioning member, a top surface of the second lower-positioning member forms a top limiting slot; wherein the first lower-positioning member is connected to the second lower-positioning member and the side walls, the first lower-positioning member protruded outward from the side walls to a side surface of the second lower-positioning member, and the first lower-positioning member forms a front blocking portion that is opposite to a bottom of the first side-positioning member.

10. The wiper adapter according to claim 9, wherein the third lower-positioning member is shaped as a rectangular block, and a side edge of the lower holding groove protrudes toward the third side-positioning member, so as to form a stepped structure.

11. The wiper adapter according to claim 1, wherein the base further includes a pair of releasing elastic arms, the pair of releasing elastic arms are respectively extended forward from a front end of the pair of bottom walls, each of the releasing elastic arms has a lateral buckle member, and the lateral buckle member is located at a top edge of the releasing elastic arms.

12. The wiper adapter according to claim 1, wherein an inner side of the pair of bottom walls forms a pivotal axle, respectively.

13. The wiper adapter according to claim 1, wherein two corners of a rear end of the top wall of the base have a chamfered shape.

* * * * *